United States Patent
Kondratowicz et al.

(10) Patent No.: US 12,122,720 B2
(45) Date of Patent: Oct. 22, 2024

(54) PROCESS FOR THE PRODUCTION OF GEOPOLYMER OR GEOPOLYMER COMPOSITE

(71) Applicant: SYNTHOS S.A., Oswiecim (PL)

(72) Inventors: Filip Lukasz Kondratowicz, Cracow (PL); Kamil Utrata, Cwiklice (PL); Marzena Mikoszek-Operchalska, Piasek (PL)

(73) Assignee: SYNTHOS S.A., Oswiecim (PL)

(*) Notice: Subject to any disclaimer, the term of this patent is extended or adjusted under 35 U.S.C. 154(b) by 116 days.

(21) Appl. No.: 16/319,202

(22) PCT Filed: Jul. 20, 2017

(86) PCT No.: PCT/EP2017/068346
§ 371 (c)(1),
(2) Date: Jan. 18, 2019

(87) PCT Pub. No.: WO2018/015490
PCT Pub. Date: Jan. 25, 2018

(65) Prior Publication Data
US 2019/0241472 A1    Aug. 8, 2019

(30) Foreign Application Priority Data
Jul. 20, 2016  (EP) .................................. 16461542

(51) Int. Cl.
C04B 28/00    (2006.01)
C04B 103/40   (2006.01)

(52) U.S. Cl.
CPC ...... C04B 28/006 (2013.01); C04B 2103/404 (2013.01); *Y02P 40/10* (2015.11); *Y02W 30/91* (2015.05)

(58) Field of Classification Search
CPC ... C04B 28/006; C04B 14/024; C04B 18/146; C04B 2103/40; C04B 22/0093;
(Continued)

(56) References Cited

U.S. PATENT DOCUMENTS 4,798,749 A    1/1989  Arch et al.
4,827,005 A    5/1989  Hilterhaus
(Continued)

FOREIGN PATENT DOCUMENTS

CN    101068863 A    11/2007
CN    101835827 A    9/2010
(Continued)

OTHER PUBLICATIONS

Glad et al., "Geopolymer with Hydrogel Characteristics via Silane Coupling Agent Additives", J. Am. Ceram. Soc., 97 [1] 295-302 (2014) (Year: 2014).*
(Continued)

*Primary Examiner* — Shuangyi Abu Ali
(74) *Attorney, Agent, or Firm* — NIXON & VANDERHYE, PC

(57) ABSTRACT

The present invention relates to a simple process for the production of geopolymer or geopolymer composite comprising additive. The process preferably comprises modification of the geopolymer or geopolymer composite. The invention further relates to a geopolymer or geopolymer composite as obtainable according to the process.

29 Claims, 9 Drawing Sheets

Particle size distribution measured using dynamic laser scattering wet method.

(58) Field of Classification Search
CPC ..... C04B 24/2676; C04B 24/42; C04B 40/00; C04B 2103/404; C04B 14/022; C04B 14/06; C04B 14/106; C04B 14/305; C04B 18/0409; C04B 18/08; C04B 18/141; C04B 40/0032; Y02P 40/165; Y02P 40/10; Y02W 30/94; Y02W 30/91
See application file for complete search history.

(56) References Cited

U.S. PATENT DOCUMENTS

| | | | |
|---|---|---|---|
| 4,871,829 | A | 10/1989 | Hilterhaus |
| 7,771,686 | B2 | 8/2010 | Sagoe-crentsil et al. |
| 10,639,829 | B2 | 5/2020 | Kondratowicz |
| 11,440,843 | B2 | 9/2022 | Kondratowicz |
| 2004/0227130 | A1 | 11/2004 | Hoerold et al. |
| 2007/0112082 | A1 | 5/2007 | Hahn et al. |
| 2008/0028994 | A1 | 2/2008 | Barlet-Gouedard et al. |
| 2008/0249199 | A1 | 10/2008 | Nising |
| 2010/0304165 | A1 | 12/2010 | Han et al. |
| 2012/0184635 | A1 | 7/2012 | Eberstaller et al. |
| 2012/0264836 | A1 | 10/2012 | Felisari et al. |
| 2013/0284069 | A1* | 10/2013 | Dubey ............... C04B 28/003 106/695 |
| 2014/0342156 | A1* | 11/2014 | Seo ................. C04B 38/00 428/402 |
| 2016/0194247 | A1 | 7/2016 | Dubey |
| 2019/0218359 | A1 | 7/2019 | Kondratowicz et al. |
| 2019/0276360 | A1 | 9/2019 | Kondratowicz et al. |
| 2023/0052386 | A1 | 2/2023 | Kondratowicz et al. |

FOREIGN PATENT DOCUMENTS

| | | |
|---|---|---|
| CN | 102430419 | 5/2012 |
| CN | 102597091 | 7/2012 |
| CN | 102604291 | 7/2012 |
| CN | 102741191 | 10/2012 |
| CN | 103449794 | 12/2013 |
| CN | 103946181 | 7/2014 |
| CN | 103980313 | 8/2014 |
| CN | 104341612 | 2/2015 |
| CN | 104803619 | 7/2015 |
| CN | 105400131 | 3/2016 |
| CN | 105462164 | 4/2016 |
| EP | 0 167 002 | 1/1986 |
| EP | 0 863 175 | 9/1998 |
| EP | 0 981 574 | 3/2000 |
| EP | 1148088 | 10/2001 |
| EP | 1 693 413 | 8/2006 |
| EP | 1 758 951 | 3/2007 |
| EP | 1 771 502 | 4/2007 |
| EP | 1 997 849 A1 | 12/2008 |
| EP | 2 899 222 | 7/2015 |
| FR | 3 019 176 | 10/2015 |
| JP | 63-183941 | 7/1998 |
| JP | 3018341 | 3/2002 |
| KR | 20110065707 | 6/2011 |
| KR | 101 431 002 | 9/2014 |
| WO | 9616948 | 6/1996 |
| WO | WO 98/31644 | 7/1998 |
| WO | 9839306 | 9/1998 |
| WO | WO 98/51735 | 11/1998 |
| WO | WO 2004/087798 | 10/2004 |
| WO | WO 2005/123816 | 12/2005 |
| WO | WO 2006/007995 | 1/2006 |
| WO | WO 2006/058733 | 6/2006 |
| WO | WO 2006/061571 | 6/2006 |
| WO | WO 2008/061678 | 5/2008 |
| WO | 2008113609 | 9/2008 |
| WO | 2008141767 | 11/2008 |
| WO | 2008145599 | 12/2008 |
| WO | 2009009089 | 1/2009 |
| WO | 2010128369 | 11/2010 |
| WO | 2010141976 | 12/2010 |
| WO | 2012146577 | 11/2012 |
| WO | WO 2013/044016 | 3/2013 |
| WO | 2015097106 | 7/2015 |
| WO | WO 2015/191817 | 12/2015 |
| WO | 2016113338 | 7/2016 |
| WO | WO 2016/113321 | 7/2016 |
| WO | 2018015490 | 1/2018 |
| WO | 2018015494 | 1/2018 |

OTHER PUBLICATIONS

Steam Distillation: When, Why, How (Year: 2015).*
Hajimohammadi et al., "One-Part Geopolymer Mixes from Geothermal Silica and Sodium Alumiate" *Ind. Eng. Chem. Res.*, vol. 47: 9396-9405 (2008).
International Search Report issued in PCT/EP2017/068346 dated Oct. 19, 2017.
International Search Report issued in PCT/EP2017/068390 dated Nov. 7, 2017.
Falah et al., "New composites of nanoparticle Cu(I) oxide and titania in a novel inorganic polymer (geopolymer) matrix for destruction of dyes and hazardous organic pollutants" Journal of Hazardous Materials, vol. 318: 772-782 (2016).
Sazama et al. "Geopolymer based catalysts—New group of catalytic materials" Catalysis Today, vol. 164: 92-99 (2011).
Extended European Search Report issued in 16461540.3 dated Feb. 15, 2017.
International Search Report issued in PCT/EP2017/068371 dated Nov. 7, 2017.
Office Action issued in EP Appln. No. 17743315.8 dated Aug. 5, 2020.
Examination Report issued in CN App No. 201780044464.4 (dated Jan. 28, 2021).
Chinese Examination Report and English Translation issued for corresponding Chinese Application No. 201780044464.4 dated Apr. 28, 2022 (11 pages).
Declaration of Dr. Filip Kondratowicz, Annex 1-2, Feb. 26, 2021, 37 pages.
De Weerdt et al., "Geopolimers—State of the art", SINTEF Building and Infrastructure, COIN Project report 37-2011, 39 pages.
Declaration of Dr. Filip Kondratowicz Re: Opposition against European patent EP 3475241 (EP17749143.8), Annex A-F, Jul. 14, 2022, 52 pages.
Duxon et al., "Geopolymer technology: the current state of the art", Journal of Materials Science (2007), 42(9)2917-2933, 17 pages.
Skvara, "Alkali Activated Materials Or Geopolymers?", Ceramics Silikaty, Submitted Jan. 17, 2007, 5 pages.
McNaught et al., "IUPAC. Compendium of Chemical Terminology,", http://iupac.org, 2005-2019 International Union of Pure and Applied Chemistry, 2nd ed. the Gold Book, 1 page.
Expert Declaration by Mr. Riccardo Felisari dated Feb. 11, 2021, titled: "Scanning electron microscopy (SEM) with energy dispersive X-ray spectrometry (EDS) of geopolymer composite", (SEM, EDS), 5 pages.
Expert Declaration by Mr. Riccardo Felisari dated Feb. 11, 2021, titled: "Flame retardancy and thermal conductivity of EPS sheets containing non-brominated flame retardants and geopolymer composite comprising coke", with Annex A, 178 pages.
Declaration of Prof. Miguel Angel Rodriguez-Perez dated Jul. 2021, 2 pages.
Campo-Arnaíz et al., "Extinction Coefficient of Polyolefin Foams", Journal of Polymer Science, Jan. 30, 2002, 10 pages.
Declaration of Dr. Filip Kondratowicz Re: Opposition against European patent EP 3 475 241 (17749143.8), Annex A-B, Jul. 13, 2021, 8 pages.
Declaration of Dr. Filip Kondratowicz, Annex A-B, Jul. 13, 2021, 13 pages.
Patentee's Response to Opponent's Grounds of Appeal dated Jan. 17, 2022 regarding EP3245172, 94 pages.
Felisari Experimental report, "Sedimentation experiment of geopolymer composite comprising coke in styrene", Dec. 21, 2020, 9 pages.
Felisari Experimental report, "Analysis of thermal conductivity model of D18 (WO 2008141767) and Syn1thos submissions D22", Jul. 13, 2021, 9 pages.

(56) References Cited

OTHER PUBLICATIONS

Domínguez-Muñoz et al., "Uncertainty in the Thermal Conductivity of Insulation Materials", Building Simulation, Eleventh International IBPSA Conference. Jul. 27-30, 2009, 6 pages.

Castiglioni et al., "Foam morphology and thermal conductivity in EPS foams", Eni Versalis Research Centre, Jul. 2016, 2 pages.

Dombrovsky et al., "Some physical models used to identify and analyze infrared radiative properties of semi-transparent dispersed materials", Journal of Spectroscopy and Dynamics, 2011, 20 pages.

* cited by examiner

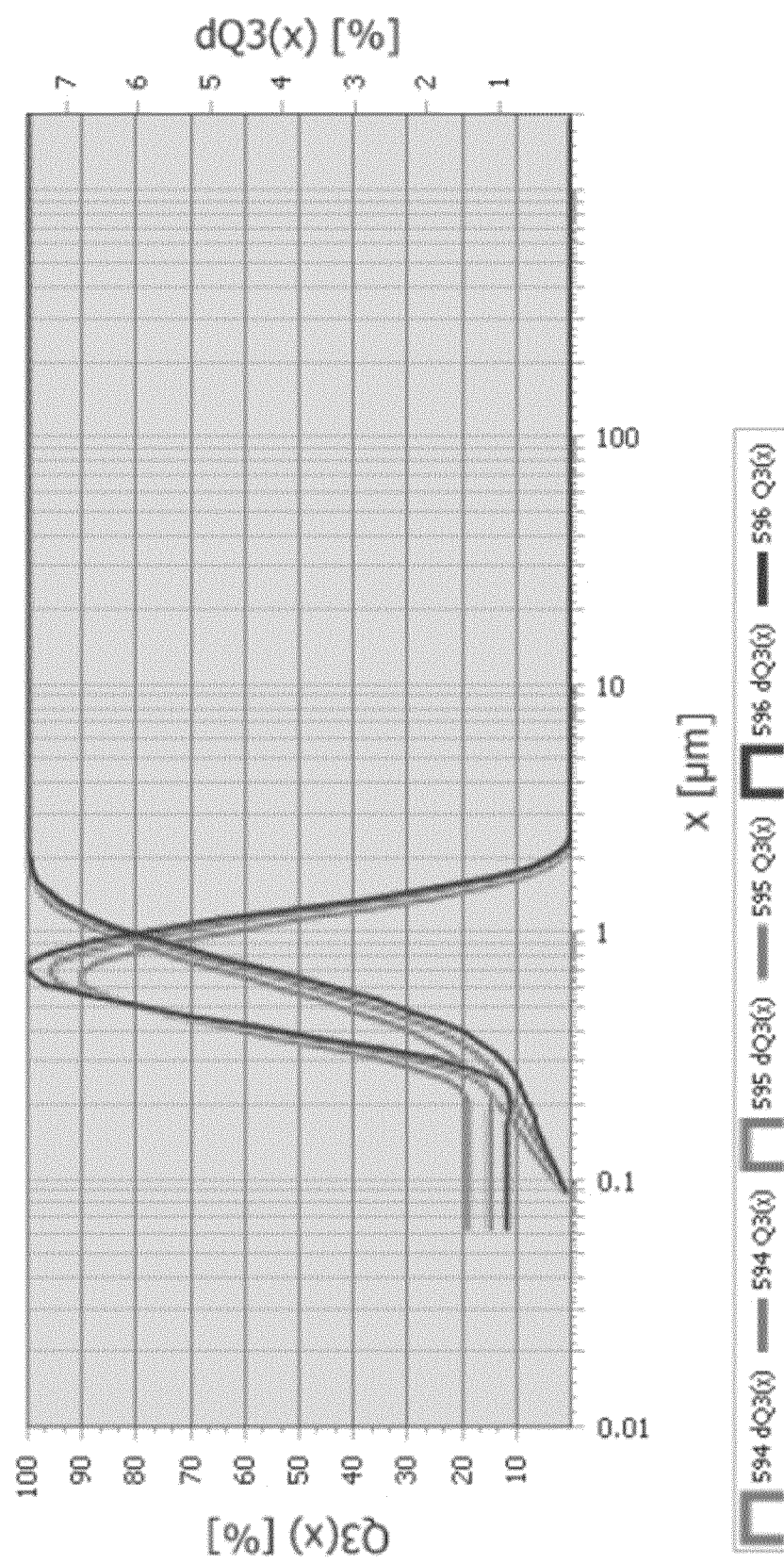
Figure 1. Particle size distribution measured using dynamic laser scattering wet method.

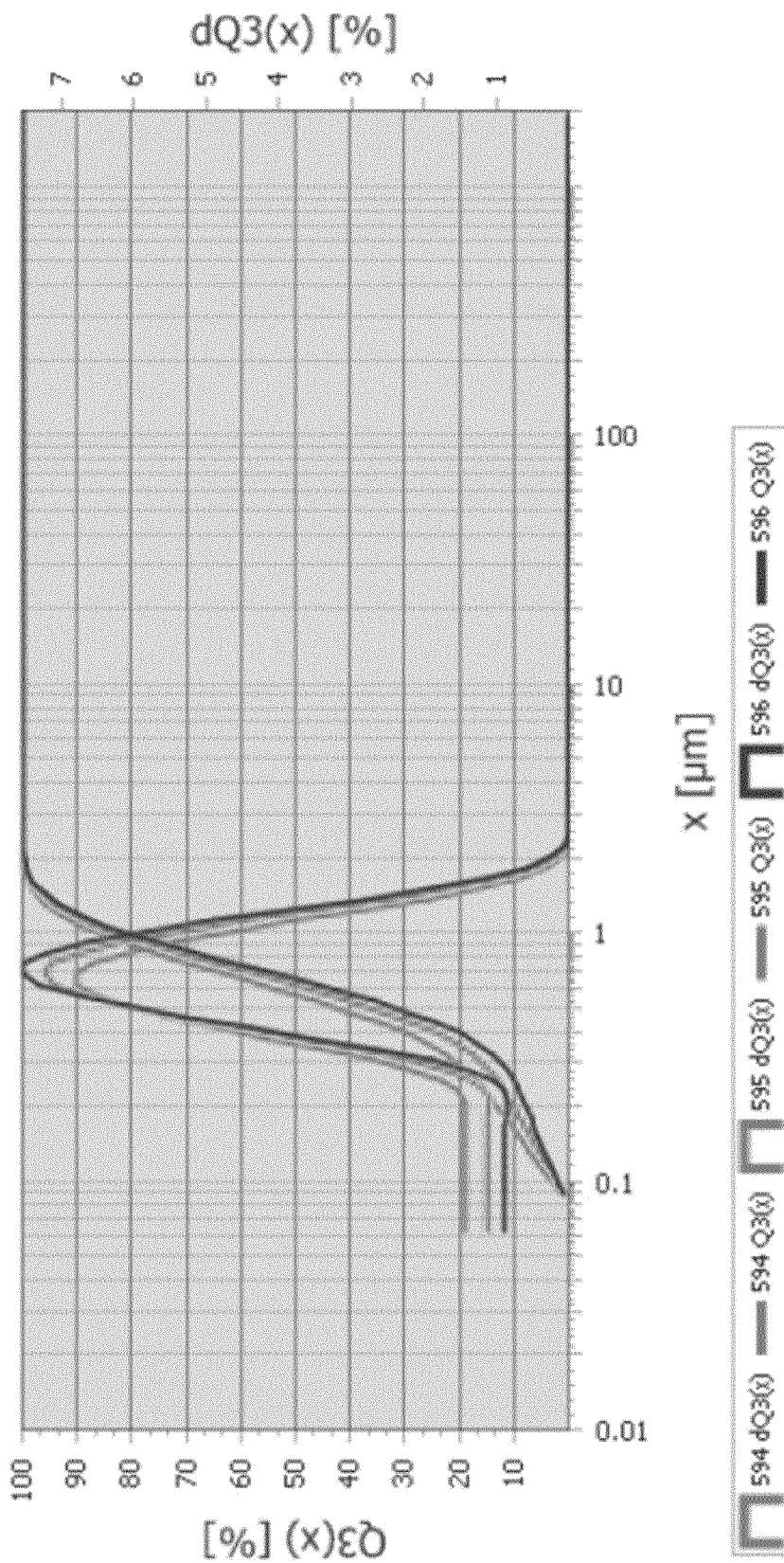
Figure 2. Particle size distribution measured using dynamic laser scattering wet method.

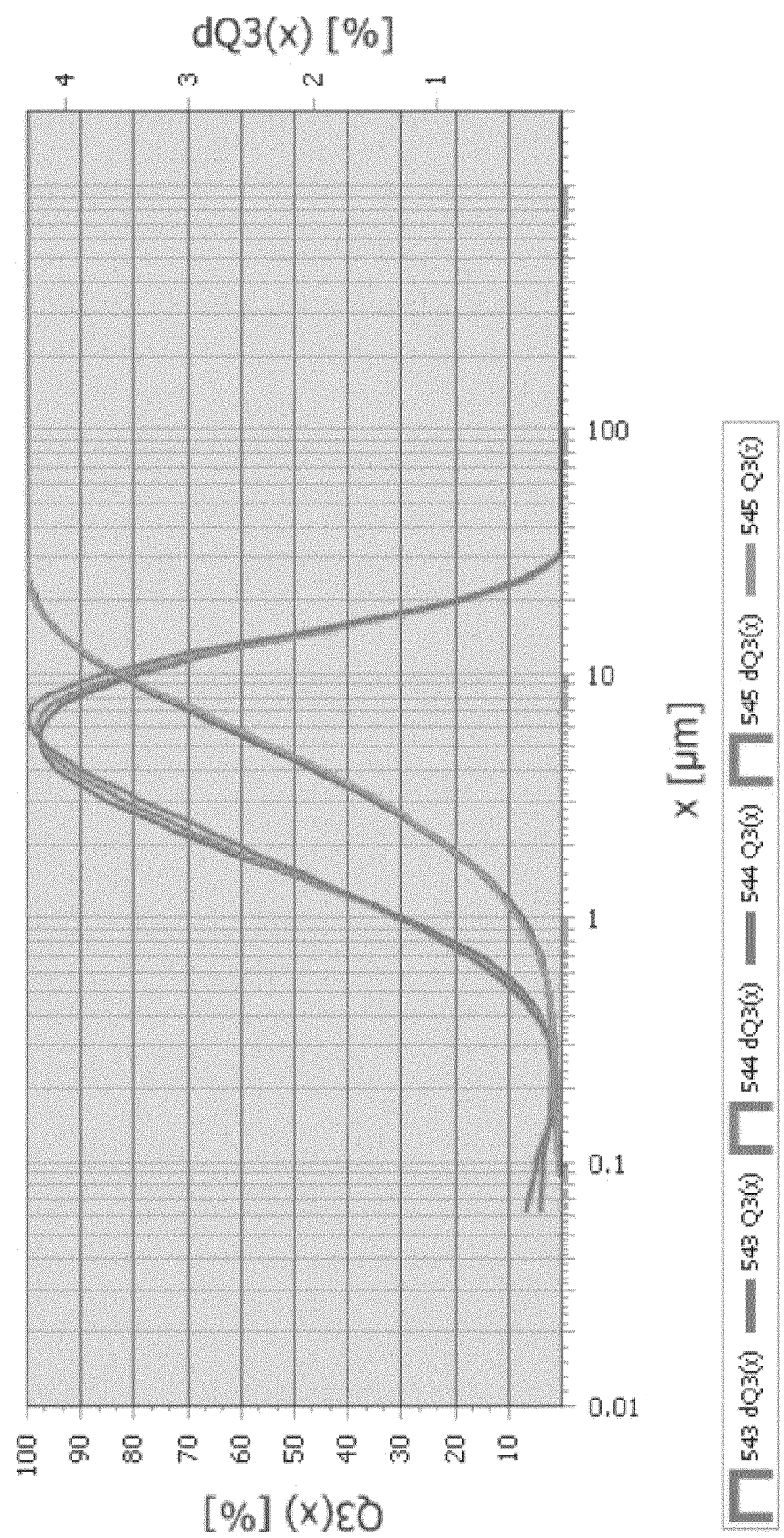
Figure 3. Particle size distribution measured using static laser scattering wet method.

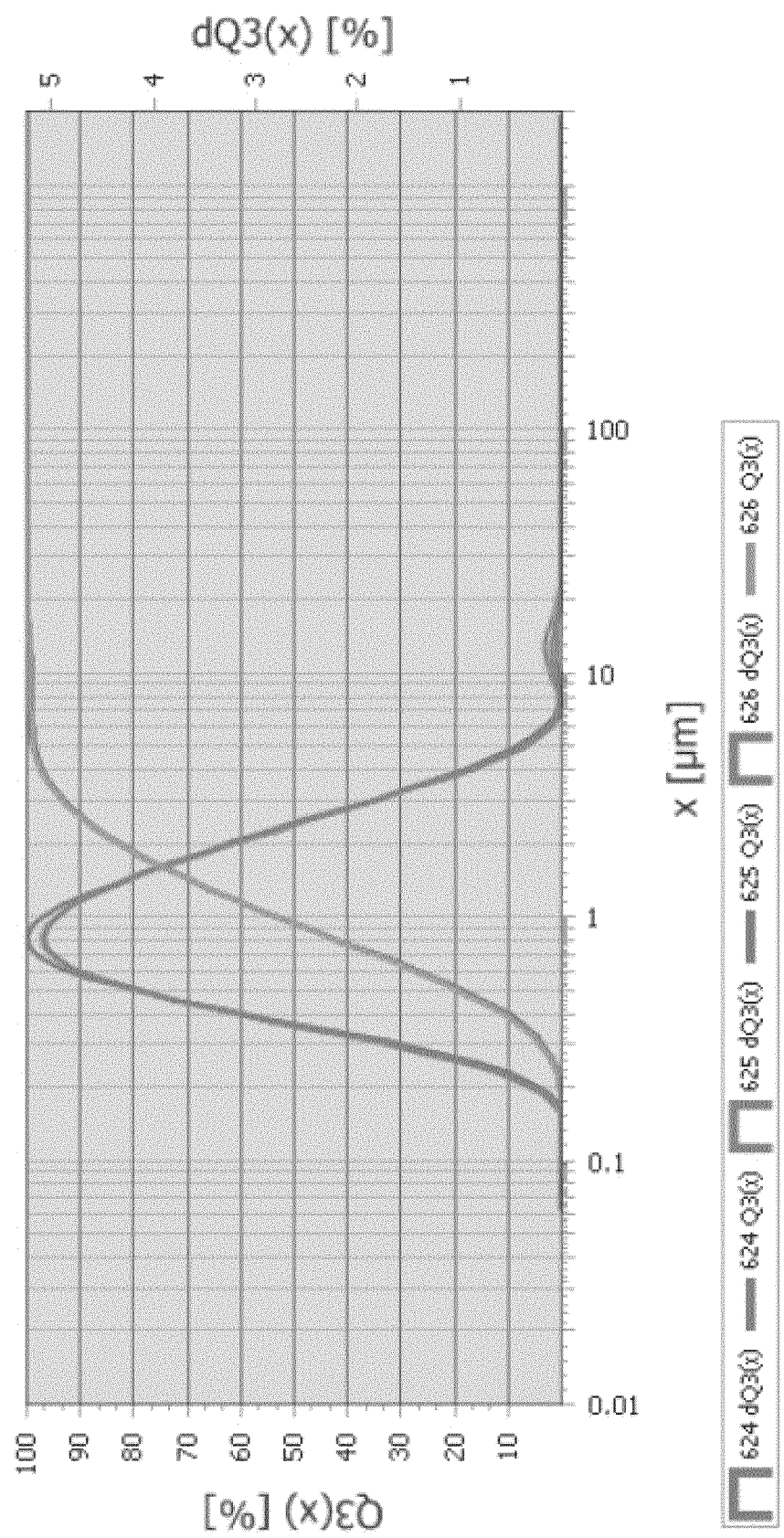
Figure 4. Particle size distribution measured using static laser scattering wet method.

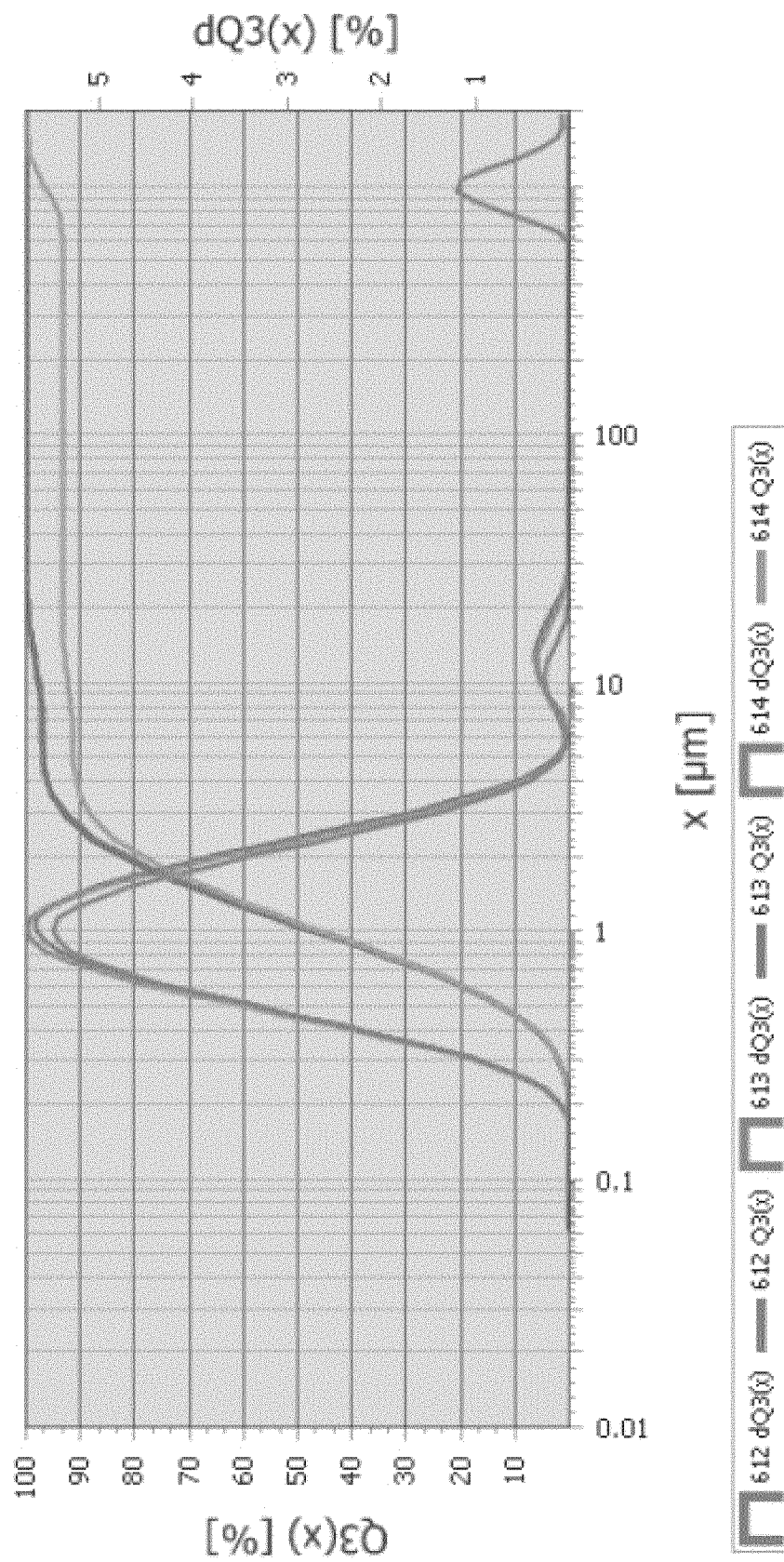
Figure 5. Particle size distribution measured using static laser scattering wet method.

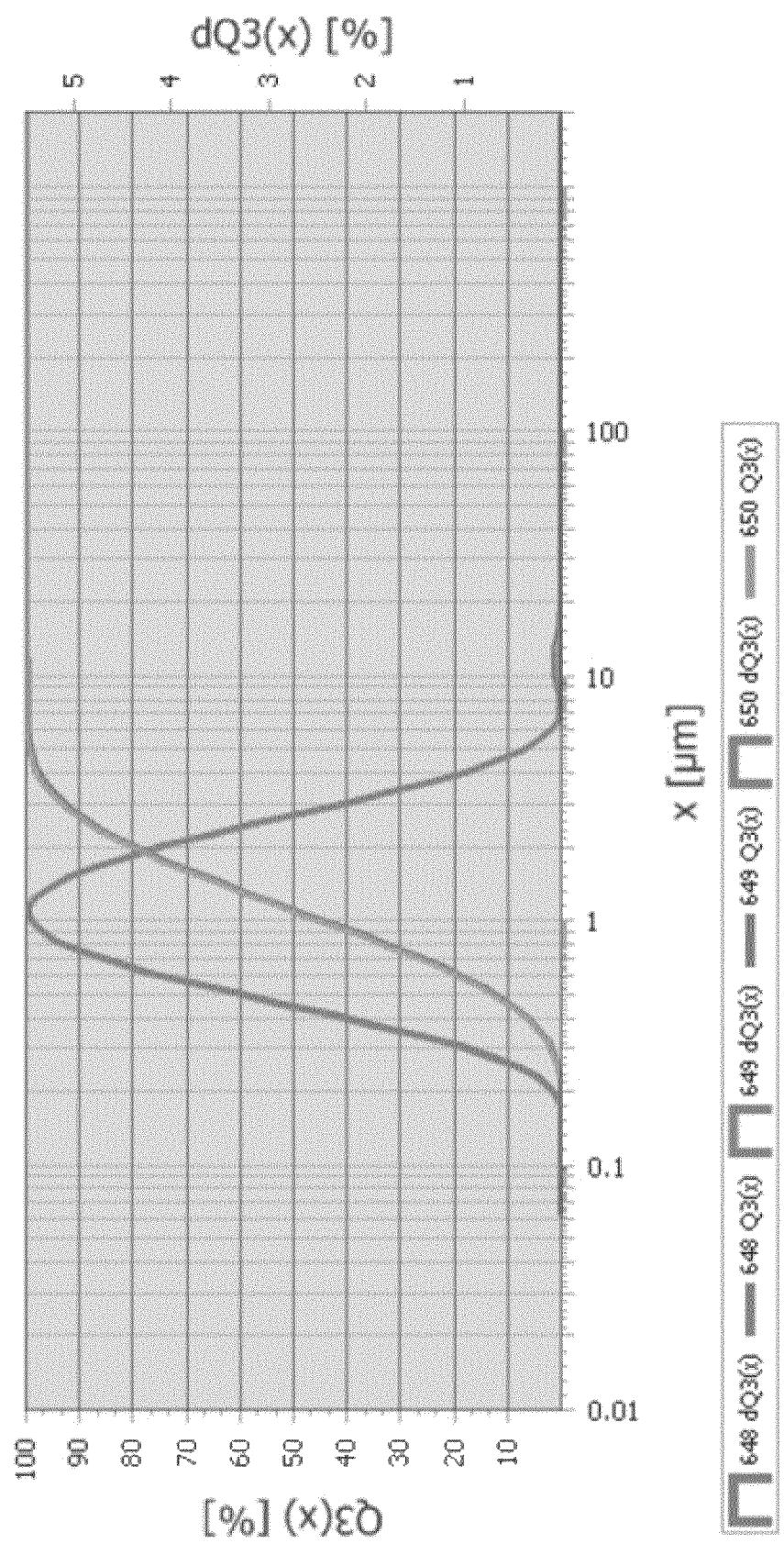
Figure 6. Particle size distribution measured using static laser scattering wet method.

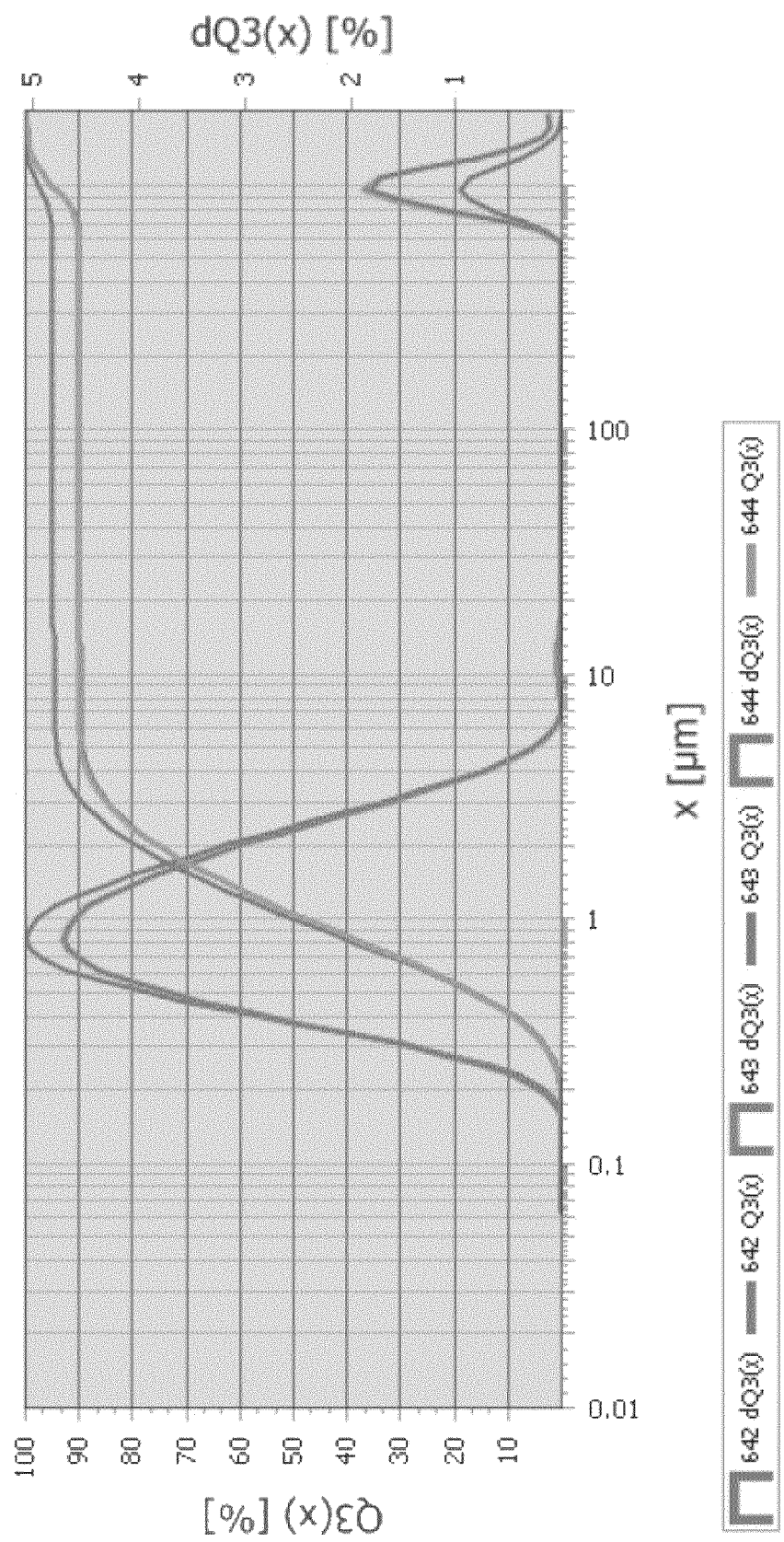
Figure 7. Particle size distribution measured using static laser scattering wet method.

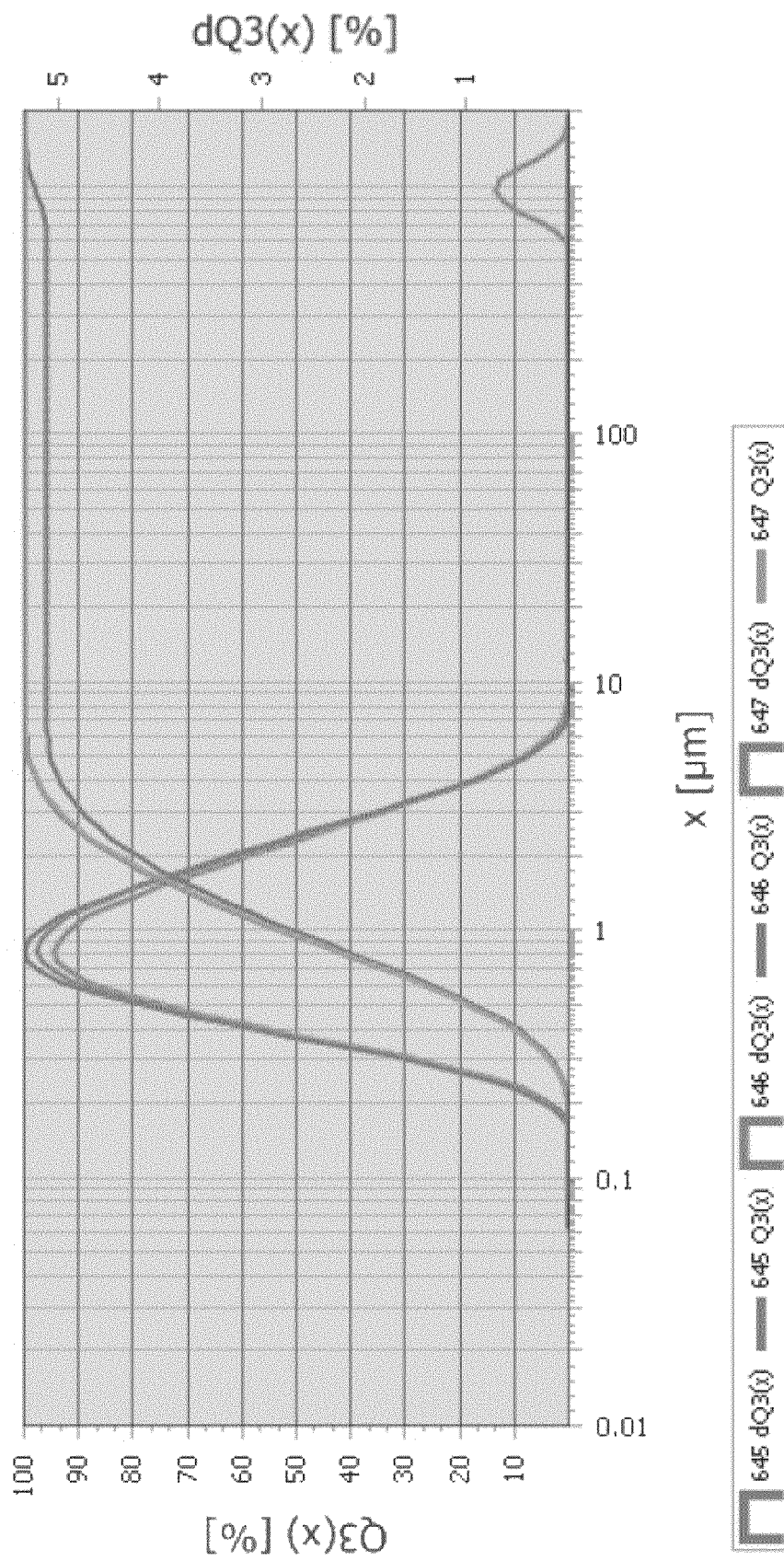
Figure 8. Particle size distribution measured using static laser scattering wet method.

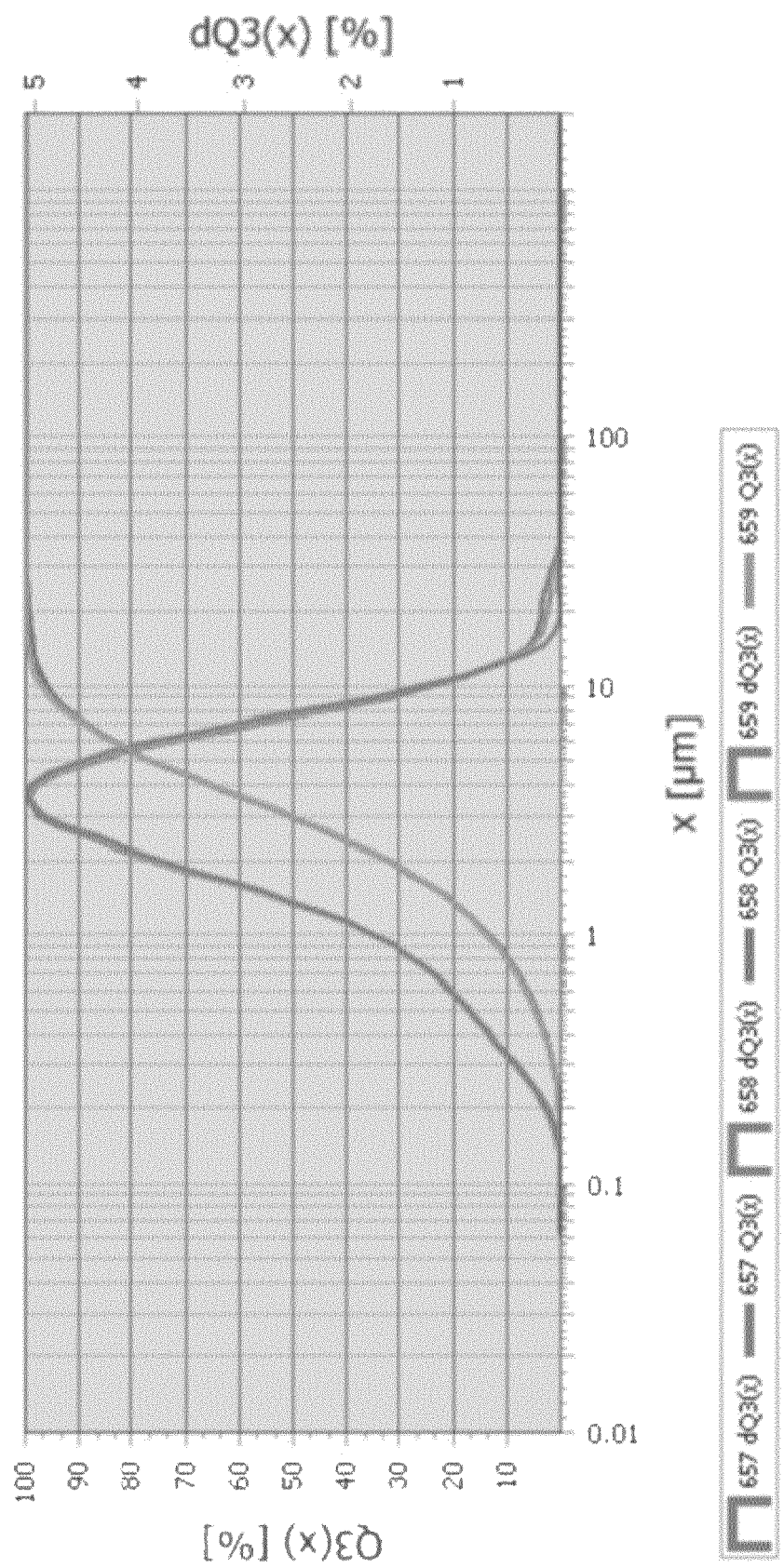
Figure 9. Particle size distribution measured using static laser scattering wet method.

PROCESS FOR THE PRODUCTION OF GEOPOLYMER OR GEOPOLYMER COMPOSITE

This application is the U.S. national phase of International Application No. PCT/EP2017/068346 filed Jul. 20, 2017 which designated the U.S. and claims priority to EP 16461542.9 filed Jul. 20, 2016, the entire contents of each of which are hereby incorporated by reference.

The present invention relates to a new process for the production of geopolymer or geopolymer composite comprising additive. The process preferably comprises modification of the geopolymer or geopolymer composite. The invention further relates to a geopolymer or geopolymer composite as obtainable according to the process.

Geopolymers are inorganic amorphous polymers with a three-dimensional, crosslinked alumina silicate structure, consisting of Si—O—Al—O bonds. The structure may be created in a sol-gel method by metal alkali activation of alumina silicate precursors. The formed gel product contains alkaline cations which compensate for the deficit charges associated with the aluminium-for-silicon substitution. During the dissolution of alumina silicate precursor and gel formation, an intermediate, aluminium rich phase is first formed which then gives way to a more stable, silicon-rich product. Under these conditions, free $SiO_4$ and $AlO_4^-$ tetrahedral units are generated and are linked to yield polymeric precursors by sharing all oxygen atoms between two tetrahedral units, while water molecules are released. The tetrahedral units are balanced by group I or II cations ($Na^+$, $K^+$, $Li^+$, $Ca^{2+}$, $Ba^{2+}$, $NH_4^+$, $H_3O^+$, which are present in the framework cavities and balance the negative charge of $Al^{3+}$ in tetrahedral coordination, i.e. $AlO_4^-$). This material was early investigated and developed by Davidovits after various catastrophic fire incidents in France in the 1970s. The term "geopolymer" was coined in view of the transformation of mineral polymers from amorphous to crystalline reaction through a geochemical process at low temperature and short curing time. Geopolymers are represented by the general chemical formula of $M_n[-(Si—O_2)_z—Al—O]_n \cdot w\ H_2O$, in which M is an alkali metal, z is 1, 2 or 3 and n is the degree of polymerization. Based on the Si/Al molar ratio, three monomeric units can be defined: polysialate (Si/Al=1; Si—O—Al—O—), polysialatesiloxo (Si/Al=2; Si—O—Al—O—Si—O—) and polysialatedisiloxo (Si/Al=3; Si—O—Al—O—Si—O—Si—O—).

The structure of geopolymers can be amorphous or semi crystalline, depending on the condensation temperature. Amorphous polymers are obtained at 20-90° C., whereas semi-crystalline polymers are obtained in the range 150-1200° C. This class of materials demonstrates ceramic-like properties, including extreme fire resistance. Geopolymers can be amorphous or crystalline materials. They possess a microstructure on a nanometre scale (as observed by TEM and measured by mercury porosimetry) which comprises small aluminosilicate clusters with pores dispersed within a highly porous network. The cluster size is typically between 5 and 10 nm. The synthesis of geopolymers from aluminosilicate materials takes place by the so-called geopolymerization process, which involves polycondensation phenomena of aluminate and silicate groups, with formation of Si—O—Al type bonds.

WO2013/044016 A2 teaches a product formed from a first material including a geopolymer resin material, a geopolymer resin, or a combination thereof, by contacting the first material with a fluid and removing at least some of the fluid to yield a product. The first material may be formed by heating and/or ageing an initial geopolymer resin material to yield the first material, before contacting the first material with the fluid.

A. Hajimohammadi et al., *Ind. Eng. Chem. Res.* 2008, 47, 9396-9405 disclose one-part geopolymer mixes from geothermal silica and sodium aluminate. FR 3 019 176 A teaches a process for the preparation of microporous and mesoporous geopolymer. WO2015/191817 A1 teaches geopolymer aggregates and their use in a variety of applications.

Furthermore, WO2016/113321 A1 teaches that the addition of geopolymer or its composite as prepared with various types of athermanous additives makes it possible to maintain the polymer foam's self-extinguishing and mechanical properties in the same range as in an expanded polymer without addition of filler or any other athermanous additive, while at the same time the thermal conductivity can be decreased significantly. This is possible because the geopolymer itself gives fire resistance, and further encapsulates the particles of athermanous additive, especially of those additives that are based on carbon or mineral, and separates them from any disadvantageous interactions with the flame, the polymer, or the brominated flame retardant. The presence of geopolymer decreases thermal conductivity, because of its own heat radiation scattering effect.

On the other hand, polymers such as vinyl aromatic polymers are known and are used for the preparation of expanded (foamed) products that are adopted in a variety of applications, of which the most important one is for thermal insulation. This is why there is a continuously increasing demand for polymers compositions (in particular when the composition is an expanded vinyl aromatic polymer composition) with low thermal conductivity as well as good mechanical and self-extinguishing properties.

The process for the production of a geopolymer composite according to the invention of WO2016/113321 A1 comprises the following steps:
a) mixing of an aluminosilicate component with an alkaline silicate solution, to form a gel,
b) adding of an athermanous additive component to the gel, to form a filled gel,
c) mixing of the filled gel, to form filled geopolymer,
d) curing, drying and milling, to give the filled geopolymer particles,
e) optional removal of cations from the filled geopolymer particles, and subsequent drying, and
f) obtaining the geopolymer composite.

In step c) of the process according to WO2016/113321 A1, the geopolymer gel is poured into moulds, dried and (jet) milled. Especially drying and milling are energy-intensive processes, especially if a jet mill is employed, and also require substantial investment costs for the necessary equipment. Also, whilst step e), the removal of cations from the filled geopolymer particles, is optional, it is mandatory if a geopolymer having a low content of cations is desired, e.g. when the geopolymer or geopolymer composite is to be used in the presence of brominated flame retardants. Step e) would then involve an additional drying step.

It was an object of the present invention to provide a process for the preparation of geopolymer and geopolymer composite which does not require energy-intensive curing, drying and milling of the geopolymer as initially formed. Also, the process should be versatile insofar as the geopolymer or geopolymer composite should be available during the process for its preparation in a form which allows for a variety of modification processes to be performed.

It has now been found that this object is solved by a process for the production of a geopolymer or geopolymer composite, comprising
a) mixing of precursor for aluminate and silicate in alkaline solution, to form a sol-gel,
b) optionally adding of one or more additives to the sol-gel, to form a filled sol-gel,
c) adding water to the sol-gel or filled sol-gel, to form a diluted sol-gel or diluted filled sol-gel,
d) mixing of the diluted sol-gel or diluted filled sol-gel, to form geopolymer or geopolymer composite,
e) obtaining a suspension of geopolymer or of geopolymer composite,
f) optional reduction of the content of alkali metal cation within the structure of the geopolymer or geopolymer composite, and
g) obtaining the geopolymer or geopolymer composite According to the present invention, step e) comprises e1) or e2)
e1) decantation,
e2) adding of an organic phase, emulsifying, and stripping of the organic phase.

According to the present invention, the geopolymer or geopolymer composite is produced in a much simpler and cheaper process in which if needed compounds such as nano particles and/or carbon-based additives such as coke or anthracite or graphene oxide or metal oxide or sulfide or metal become encapsulated by the chemical and physical bonding into the geopolymer matrix during the process of production. This is possible by implementing the direct formation of particles of geopolymer or geopolymer composite via water dispersion or organic phase emulsification of the geopolymeric or geopolymeric composite sol-gel. Such process can be performed in one or a cascade of reactors in which dealkalization, acid modification, and ion exchange can take place. In this case there is no needed lengthy and problematic curing process, lengthy and energy-consuming drying process, and finally also energy consuming milling process with the use of a jet mill as necessary steps to obtain a steep D50 average particle size distribution. With the process of the invention, various types of modifications can be performed, including for example silane coupling and/or latex hybridization.

The invention is thus based on the finding that, in a process for the production of geopolymer or geopolymer composite, curing, drying and milling of geopolymer or geopolymer composite as initially formed can be dispensed with. Advantageously, the process allows for various modifications of the geopolymer or geopolymer composite, for instance during a dispersion stage in embodiment 1 (involving e1), decantation), or during an emulsion stage in embodiment 2 (involving e2), adding of an organic phase, emulsifying, and stripping of the organic phase), or in both embodiments I and II during initial steps a) to d) and during subsequent steps f) and g).

The present invention has the following aspects:
I) a process for the production of geopolymer or geopolymer composite; and
II) the geopolymer or geopolymer composite as obtainable according to the process.

FIGS. 1 to 9 show particle size distribution data, as determined by static laser scattering (wet method). Each of the figures shows the data for three measurements, confirming a good reproducibility.

DETAILED DESCRIPTION

I) Process for the Preparation of Geopolymer (Composite)

According to the first aspect, the present invention relates to a process for the production of a geopolymer or geopolymer composite. The process comprises
a) mixing of precursor for aluminate and silicate in alkaline solution, to form a sol-gel,
b) optionally adding of one or more additives to the sol-gel, to form a filled sol-gel,
c) adding water to the sol-gel or filled sol-gel, to form a diluted sol-gel or diluted filled sol-gel,
d) mixing of the diluted sol-gel or diluted filled sol-gel, to form geopolymer or geopolymer composite,
e) obtaining a suspension of geopolymer or of geopolymer composite,
f) optional reduction of the content of alkali metal cation within the structure of the geopolymer or geopolymer composite, and
g) obtaining the geopolymer or geopolymer composite, wherein step e) comprises
e1) decantation,
or
e2) adding of an organic phase, emulsifying, and stripping of the organic phase.

In a preferred embodiment, the mixing in step a) comprises the mixing of an aluminosilicate, a phosphoaluminate, an alkaline silicate and/or an alkaline aluminate. Thus, in a first step, the sol-gel is prepared, for instance from a mixture of aluminosilicate precursor and activator such as sodium aluminate or sodium disilicate, with addition of water. It is also preferred in the process according to the present invention to use sodium disilicate or sodium aluminate or their potassium analogues. Especially, it is preferred that the alkaline solution is a water-diluted sodium aluminate or sodium disilicate, in particular sodium aluminate.

According to the invention, step a) is preferably performed by mixing of precursor for aluminate and silicate, to form a sol-gel, wherein the mixing is under alkaline conditions.

Also, it has been found that the use of a geopolymer or a geopolymer composite prepared from a mixture of aluminosilicate precursor and phosphoaluminate further enhances the self-extinguishing effect in vinyl aromatic polymer foams.

Also, this improvement is achieved when this type of athermanous and flame retarding constituent is used in other expandable vinyl polymers, such as polyethylene and polypropylene, or even other type of polymers, such as polyamides, polyurethanes, polyesters, polyimides or various types of resins.

In a further preferred embodiment, the mixing in step a) involves one or more materials selected from the group consisting of dehydroxylated kaolinite, metakaolin, metakaolinite, fly ash, furnace slag, red mud, thermal silica, fumed silica, halloysite, mine tailings, pozzolan, kaolin, and building residues, preferably the mixing in step a) involves one or more materials selected from the group consisting of metakaolin, metakaolinite, furnace slag, fly ash, and fumed silica, in particular the mixing in step a) involves metakaolin or metakaolinite, furnace slag, fly ash, or a mixture thereof.

The mixing may be a high speed mixing of an aluminosilicate component with an alkaline silicate solution prepared from sodium or potassium water glass or sodium aluminate or sodium disilicate or phosphoaluminate or mixture thereof, to form the sol-gel. Preferably, the activator is in particular sodium silicate water solution (so called water glass), dry sodium silicate, sodium disilicate, calcium silicate, potassium silicate, sodium aluminate, calcium aluminate, or potassium aluminate.

The first step a) may be a high speed mixing and dissolution of an amorphous phase of aluminosilicate precursor and/or phosphoaluminate component in an alkaline solution prepared from a water solution of sodium hydroxide and silicon dioxide (water glass) or a water solution of sodium disilicate or a water solution of sodium aluminate with or without addition of phosphoaluminate.

The activator may instead of sodium water glass be sodium aluminate or sodium disilicate or a mixture thereof. Also, the sol-gel may be prepared from a mixture of aluminosilicate precursor and activator such as sodium aluminate or sodium disilicate, with addition of water.

It is further preferred in the process according to the invention that the water alkaline silicate comprises one or both of sodium silicate and potassium silicate, in particular the alkaline silicate is sodium silicate.

It is also preferred in the process according to the present invention to use sodium disilicate or sodium aluminate or their potassium analogue.

It is further preferred in the process according to the invention that the alkaline solution is a water diluted sodium aluminate or sodium disilicate, in particular sodium aluminate.

Particularly preferred precursors are dehydroxylated kaolinite, metakaolin or metakaolinite, but also fly ash, furnace slag, red mud, thermal silica, fumed silica, halloysite and a mixture thereof.

After activation and dissolution, the ortho-sialate monomer $[(HO)_3—Si—O—Al—(OH)_3]$ polycondensates and forms a sol-gel, so called "gel". The mixing is in a third step c) continued. Preferably, in step b), there is an addition of an additive, in micro or in nano powder form. During step a), b) or c), water can be introduced as a viscosity modification additive, and/or silane and/or latex as adhesion modifiers.

The weight ratio of alkali silicate or aluminosilicate solution to the metakaolin or fly ash or silica is preferably at most 1/1, more preferably at most 9/10, most preferably about 8/10. The weight ratio depends strictly on the molar ratio of Si/Al in the final modified geopolymer. The molar ratio of silicon versus aluminium determines the chemical structures, properties and thereby the field of application of the resultant modified geopolymers. Modified geopolymers can be classified in term of their chemical structure, taking the Si/Al molar ratio into account. If the molar ratio is 1, the geopolymer consists of (—Si—O—Al—O—) repeating monomeric units—poly(sialate), in the case of Si/Al=2, the geopolymer structures are enriched in additional silica tetrahedron units—(—Si—O—Al—O—Si—O)—poly(sialate-siloxo). Participation of the silica tetrahedron units into a chain increases with an increasing level of Si incorporation. Thus, a molar ratio equal to 3 provides (—Si—O—Al—O—Si—O—Si—O) structures—poly(sialate-disiloxo), whereas a molar ratio above 3 results in more rigid three dimensional silico-aluminate structures. Regarding the applications, geopolymers may be categorized as follows: Si/Al=1 (typically bricks, ceramics, fire protection); Si/Al=2 (typically geopolymer cement, concrete, radioactive encapsulation); Si/Al=3 (typically heat resistance composites, foundry equipment, fibre glass composites); Si/Al>3 (typically sealants for industry); 20<Si/Al<35 (typically fire and heat resistance fibre composites).

Changes in the Si/Al ratio can drastically affect the flexibility of obtained modified geopolymer. According to the present invention, the smaller the value of the Si/Al ratio, the more flexible is the modified geopolymer. This was especially observed in the case of a Si/Al ratio of about 1, where aluminosilicates formed "more flexible" poly(sialate) structures, as compared to a 3D network of poly(sialate-siloxo) and poly(sialate-disiloxo) exhibiting shrinkage and cracks. It is known that such a flexibility was observed when the molar Si/Al ratio exceeds 30, with the much higher content of Si in the matrix constituents.

In accordance with the present invention, mixing is preferably performed using a high shear rotor/stator homogenizer, with a speed in the range of from 100 to 30,000 rpm.

In a further preferred embodiment, one or more of step a) and step c) comprises mixing in a conical screw mixer. Preferably both step a) and step c) comprise mixing in a conical screw mixer.

Mixing is typically carried out at ambient temperature for a minimum of 1 minute and a maximum of 60 minutes. In this step, after the addition of the alkaline silicate solution (so called water glass), silane may preferably be added to the gel, in order to improve adhesion of geopolymer in particular to carbon-based athermanous additives and later to the filled polymer. The concentration of silane is preferably in the range of from 0.01 to 10 wt. %, more preferably in the range of from 0.05 to 5 wt. %, most preferably from 0.1 to 3 wt. %. Geopolymer or geopolymer composite may thus be modified by reaction with coupling agents, to obtain better adhesion to the vinyl aromatic expandable polymers. Different coupling agents may be used, depending on when the addition during the preparation of the geopolymer or the geopolymer composite takes place. However, this depends on the type of geopolymer used and the type of additive within the geopolymer composite.

Firstly, an adhesion of geopolymer or geopolymer composite to the polymer can be improved by its in situ modification (reaction) with silanes or organometallic titanates, zirconates (such us Ken-React produced by Kenrich Petrochemicals Inc.). The silane or titanate etc. can be added as weight percent per percent of geopolymer solid mass. It can be added in the range of 0.01-10.0 wt. % per 100 wt. % of geopolymer solid mass; in particular 0.1-5.0 wt. %, especially 0.5-3.0 wt. %.

Secondly, the adhesion of geopolymer or geopolymer composite to the vinyl aromatic polymer can be further improved by surface modification with silane or vinyl silane of the final powder form of prepared geopolymer or geopolymer composite. The silane or vinyl silane can be added as weight percent per 100 wt. % of powder. In can be added in the range of 0.01-10.0 wt. % per 100 wt. % of geopolymer solid mass; in particular 0.1-5.0 wt. %, especially 0.5-3.0 wt. %.

Another opportunity for hydrophobicity improvement is butadiene latex addition to the geopolymer gel. The resulting modified geopolymer or modified geopolymer composite has an improved adhesion to vinyl aromatic polymer, better dispersion of modified geopolymer or modified geopolymer composite in the polymer matrix, and improved mechanical properties. The concentration of butadiene latex is preferable in the range of from 1 to 50% wt. %, more preferable in the range of from 5 to 25 wt. %. The used latex can be butadiene copolymer latex eg. butadiene-styrene latex (e.g. LBS 3060 S from Synthos) and carboxylic modified butadiene latex e.g. (LBSK 5545 from Synthos).

Whilst various silanes can be used, the best adhesion performance is achieved when using aminopropyltriethoxysilane (e.g. Dynasylan AMEO from Evonik), aminopropyltrimethoxysilane (e.g. Dynasylan AMMO from Evonik), phenyltriethoxysilane (e.g. Dynasylan 9265 from Evonik), 3-methacryloxypropyltrimethoxy-silane (e.g. Dynasylan MEMO form Evonik) and vinyltrimethoxy-silane (e.g. Dynasylan VTMO from Evonik).

Thus, in a very preferred embodiment of all aspects of the present invention, silane is added, preferably in step a). When the silane is e.g. 3-methacryloxypropyltrimethoxysilane, the process further preferably comprises the addition of a butadiene latex in one or more of steps a), b) and c) (preferably, the addition of the butadiene latex is in one or more of steps a) and step b)).

In a further preferred embodiment, silane is added to the geopolymer composite in any one of step e), optional step f) and step g). In this embodiment, the silane is preferably selected from aminopropyltriethoxysilane, aminopropyl-trimethoxysilane, phenyltriethoxysilane, 3-methacryloxypropyl-trimethoxysilane, and mixtures thereof.

It is most preferred that silane is added in an amount of from 0.01 to 10 wt. %, more preferably from 0.05 to 5 wt. %, most preferably from 0.1 to 3 wt. %, based on the weight of modified geopolymer or modified geopolymer composite.

Step c) involves the addition of water, preferably in a weight ratio range of solid phase to water from 1 part of solid to 0.1 to 30 parts of water.

Also, it is preferred that the additive is an athermanous additive, preferably selected from the group consisting of
 a. carbon-based athermanous additives,
 b. metal athermanous additives,
 c. metal oxide athermanous additives, and
 d. metal sulfide athermanous additives.

Preferably, the additive as used in combination with (preferably modified) geopolymer or as incorporated into (preferably modified) geopolymer composite is one or more selected from the group consisting of
 a. carbon black, cokes (for example a petroleum coke and/or metallurgical coke), graphitized carbon black, graphite oxides, various types of graphite (especially poor and amorphous forms with a carbon content in the range of from 50 to 90%) and graphene or graphene oxide and various types of anthracite,
 b. titanium oxides, ilmenite, rutiles, chamotte, fly ash, fumed silica, hydromagnesite, huntite, barium sulphate, and mineral having perovskite structure,
 c. metal oxides, preferably titanium oxides, iron oxides, silicon oxides, chromium oxides, nickel oxides and more based on metals from element table groups of IIIB, IV-VIIIA, I-VB,
 d. metal sulfides, preferably nickel sulfide, tungsten sulfide, copper sulfide, silver sulfide, and more sulfides are possible,
 e. nano particles of graphite oxides and titanium oxides, iron oxides, silicon oxides, chromium oxides, metal sulfides, metals such as nickel, barium sulphate and component having perovskite structure, tricalcium phosphate,
 preferably the (preferably modified) geopolymer comprises one or more carbon-based additives selected from the group of heat absorbers and heat reflectors presented above,
 in particular the carbon-based additive is carbon black, graphite, graphite oxide, graphene oxide, coke, anthracite or a mixture thereof.

The second and optional step b) is thus the incorporation of additives, preferably one or more athermanous additives. Preferably such additive could be carbon black, graphite, coke, anthracite, graphite oxide.

In particular, the following cokes could be used: petroleum coke, metallurgical coke, shot coke, sponge coke, fluid coke, beaded coke, needle coke, pitch coke or anode coke.

In particular, the following anthracites could be used: green anthracite, semianthracite, anthracite, meta-anthracite or gas calcined anthracite and electrically calcined anthracite or dealkalized and desulphurized types of anthracite.

Additionally, other types of carbon based additive are possible, such as sea coal, graphene oxide, nanotubes or carbon fibers.

In a preferred embodiment, additive a. is selected from coke, graphitized carbon black, graphite oxides, graphite, anthracite, graphene oxide, and nano-graphite and carbon nanotubes (single and multilayer).

Thus, in a preferred embodiment of all aspects of the invention, additive a. is selected from coke, graphitized carbon black, graphite oxides, graphite, anthracite, graphene oxide, and nano-graphite and carbon nanotubes (single and multilayer). Most preferred in all embodiments of the invention is that the athermanous additive is a carbon athermanous additive selected from graphene oxide, nano-graphite, and mixtures thereof.

Alternatively, metal oxides could be added, preferably, titanium dioxide, iron oxide, chromium oxide, silicon oxide or nickel oxide or their nanoforms.

Further alternatively, metal sulfides such as tungsten sulfide or nickel sulfide are possible as additives.

The incorporation of ilmenite, rutile, perovskite mineral, barium sulphate, chamotte, fumed silica, fly ashes, hydromagnesite/huntite mineral or the mixture of all or minimum two additives to the forming geopolymer gel is likewise preferred.

After (optional) additive incorporation, the high shear mixing is continued, and further geopolymerization takes place, and additive is physically encapsulated or chemically reacted by growing chains of geopolymer, thus the surface becomes modified.

The additive, or a minimum of two additives, is preferably added in an amount of from 0.01 to 80 wt. %, more preferably from 0.05 to 60 wt. %, most preferably from 0.1 to 50 wt. % depending on the type of the additive or additive mixture, based on the weight of geopolymer composite. Different mixtures and different ratios between the additives are possible. After addition of additive, or mixture of at least two additives from the above proposed, the thixotropic gel is further high speed mixed, to result in a homogenous consistence. Water can then be added, to regulate the final viscosity. The water is added in a preferred ratio from 1/10 to 10/10 or depending on additive type and its bulk density as well as hydrophilic properties and specific surface.

For the geopolymer composite synthesis the following athermanous additives are preferably used:
 a) carbonaceous substances such as various grades of carbon black including furnace black, lamp black, channel black, thermal black and acetylene black; various grades of petroleum coke—including needle, regular and sponge coke, calcined petroleum coke; various grades of natural and synthetic graphite.
 b) mineral substances, synthetic and natural ones, such as titanium dioxide, rutile, ilmenite, minerals with perovskite structures, kaolin, mica, talc, barium sulphate, tricalcium sulphate, tricalcium phosphate, silica and more possible substances according to WO 2006/058

733 A1, EP 0 863 175, EP 0 981 574, EP 1 758 951, EP 1 771 502 A2, WO 2004/087798 A1, WO 2008/061678 A2, WO 2006/061571 A1, and the other existing applications.

It is very much preferred that the process according to the first aspect includes optional dealkalization step f). Preferably, step f) comprises the addition of an acid solution, and subsequent drying. In particular, step f) comprises addition of an acid solution, washing with water, and subsequent drying.

In a preferred embodiment, the process according to the invention further comprises modification with one or more water-soluble compounds, preferably the modification is in one or more of step f) and step g), resulting in modified geopolymer or modified geopolymer composite, respectively. The water-soluble compound is preferably selected from phosphorus compounds, nitrogen compounds, copper compounds, silver compounds, zinc compounds, tin compounds, and magnesium compounds. Preferably, the modification is with a phosphorus compound, in particular with a phosphorus compound selected from phosphoric acid and ammonium polyphosphate.

Also, the modification of geopolymer or geopolymer composite gives materials having a better stability, such as improved adhesion to the polymers into which they are incorporated. Moreover, the modification allows one to use certain types of additives that would otherwise be unsuitable for use in expandable vinyl aromatic polymers and expanded vinyl aromatic polymer foams.

According to the present invention, the geopolymer or geopolymer composite is produced in several process steps in which if needed additive (such as coke or anthracite or graphene oxide or metal oxide or sulfide or metal) becomes encapsulated by chemical and physical bonding into the geopolymer matrix. This type of geopolymer is suitable for performing a self-extinguishing action and further reducing the thermal conductivity properties of vinyl aromatic polymers and expanded foam products made thereof. Additionally, it was found that the self-extinguishing effect could be enhanced when a relatively small amount of modifier, e.g. a phosphorus compound such as phosphoric acid or ammonium polyphosphate, is used to alter the surface of geopolymer or geopolymer composite. It was found that this surface modification can help to reduce the amount of brominated flame retardant or completely eliminate the need to use any brominated flame retardant.

It was further found that better self-extinguishing properties are obtained when the content of cations such as sodium or potassium in geopolymer or geopolymer composite is limited to below 200 ppm, namely when geopolymer or geopolymer composite is added to the product in the co-presence of brominated flame retardant. This is because especially sodium accelerates the thermal decomposition of brominated molecules, with creation of bromic acid and salt, respectively.

Also, geopolymer or geopolymer composite suspended in water can be ion exchanged. In was discovered that, following the dealkalization in which exchange of sodium or potassium cations by hydrogen cations is realized, or alternative to such dealkalization, an ion exchange can be performed. Such ion-exchanged particles of modified geopolymer or of modified geopolymer composite (incorporating ions of Ag, Zn, Cu, Cu, Ni, Sn, Mg) further improves the reduction of thermal conductivity of polymeric foams, acting additionally as antimicrobial agent.

The sixth and optional step f) is a dealkalization, to remove cations from the geopolymer matrix, preferably by addition of concentrated hydrochloric acid to the particles of geopolymer or geopolymer composite, as suspended in water. The reaction is preferably performed within 1 h and in a temperature range of from 50° C. to 90° C. in a heated/cooled dissolver, with an agitation speed in the range of 500 to 1500 rpm. Reaction typically results in the release of hydrogen sulphide and sulphur dioxide, as well as a pH change in the range of 3-13. Additionally, the viscosity of the slurry increases significantly due to change of particles surface and geopolymer interaction with water. Process water having a conductivity below 1000 µS/cm may be used for the dealkalization step.

Subsequently, a first step membrane filtration may be performed and finished with an inside press pressure in the range of 3-8 bar; received filtrate conductivity is typically in the range of 60,000 to 150,000 µS/cm. Afterwards, the salts are washed with the use of so called "process water", having a conductivity of below 1000 US/cm and finally after minimum 20 minutes receiving the filtrate with a conductivity below 500 µS/cm. At the end, a pressure (10-25 bar) membrane squeeze may be applied, to increase the solids content in the precipitate cake from 50 up to 60 wt. %. This step avoids a strong thixotropic effect which would otherwise make granulation of the precipitated cake (to transport it to the repulpation stage) difficult, thus, the water content must be reduced. An alternative is to reduce the precipitate's pH value by pumping a weak solution of acid through the cakes.

The "cake" may then be granulated and suspended in a weak acid solution. An acidic suspension of a geopolymer or a geopolymer composite is affected in a dissolver, equipped with two types of agitators for avoiding agglomeration of suspended precipitate on the dissolver walls, a high speed (100-1500 rpm) agitator and a low speed (10-200 rpm) agitator. 1 h is typically enough to perform this repulpation step. Different acids could be used, such as hydrochloric acid, phosphoric acid, nitric acid or sulphuric acid. Organic acids may also be used. The elution could be performed as more repulpation—filtration steps, to improve reduction of sodium and other metal cations, especially if a sodium content in the final material below 100 ppm is desired. In some other applications, when the geopolymer or geopolymer composite is not used together with brominated flame retardants at the processing temperatures, such repeated elution may not be necessary. This depends on the final application of the geopolymer or geopolymer composite.

Before the acid modification to remove the thixotropic effect and after the process water washing, washing with demineralized water is possible, or demineralized water could be used instead of process water.

A second step of filtration may be necessary. The slurry, which after repulpation has a pH in the range of 2-5, may be pumped to the membrane press and filtrated, ending with an inside press pressure in the range of 3-8 bars. Any remaining acid and salts may then be washed, giving a filtrate with a conductivity below 500 µS/cm. Preferably, cold demineralized water is used, to reduce production cost related to water heating energy. However, with hot water having a temperature in a range of from 20° C. to 80° C., it is possible to accelerate elution and to reduce water consumption. Preferably, further salt elution is performed after the second filtration step, with the use of demineralised water.

In step g), the surface modification may be performed, for instance by treating the precipitated cake with a demineralized water solution of acid, preferably phosphoric acid or phosphates or its salts or polyphosphates or its salts. The surface modification by phosphorus and/or nitrogen based compounds may thus be performed with the use of an aqueous solution. The aqueous solution of the phosphorus and/or nitrogen based compound is transferred in one or more cycles through the filter press. If this step is needed because of the application of the resultant modified geopolymer or modified geopolymer composite, it is often performed before the membrane squeeze and vacuum drying in the membrane filter press.

The modification can alternatively be an ion exchange, with the use of a water solution of a salt such as copper chloride, silver nitrate, or magnesium sulphate, or some other salt which is soluble in cold or hot water.

Also, step f) preferably comprises repulpation (re-forming of a pulp), more preferably the repulpation is with demineralized water or an acid solution, in particular the repulpation is with an acid solution. Moreover, step f) preferably comprises a membrane squeeze.

Optional step f) thus preferably comprises addition of acid to the geopolymer or geopolymer composite, as dispersed in water, and performing dealkalization at normal or at elevated temperature, and continuing the high shear mixing to better modify the surface of the geopolymer or geopolymer composite.

Acid or salt modification in the repulpation step is thus possible, to reduce agglomeration in the second filtration step and to modify the particle surface.

Geopolymer or geopolymer composite in form of precipitated cake in step g) is e.g. membrane squeezed, to increase the solids content up to 60 wt. %, and heated by the relatively low steam pressure of about 0.35 MPa to a temperature in the range of from 60 to 150° C. Thus, the vacuum drying may be performed in a membrane filter press, using steam for heating. In cycles, vacuum is applied and the pressure in the press is reduced to below 0.2 mbar. The cycles depend on the cake's thickness and the preferred temperature. Preferably, a cycling such as heating to a temperature of above 90° C. is performed, and then the pressure is reduced to below 0.7 mbar. The vacuum cycle is finished when the temperature drops below 70° C. and again heating is applied. The drying step is finished when the water content in the precipitate is in the range of 1 to 20 wt. %. After that, the cake is removed from the press automatically and granulated for example with the use of a cum crusher, or a screw crusher, or a hammer mill, or any other type of crusher, followed by deagglomeration in an impact mill with a rotor speed in the range e.g. from 1000 to 10000 rpm. After impact milling, the fine powder is recovered and ready for use.

Instead of vacuum drying and "cake" milling, the water suspension of geopolymer or geopolymer composite may be spray dried, resulting in a solid phase in form of powder. The rotary disk and single-fluid high pressure swirl nozzles can be used. Alternatively, a system with ultrasonic nozzles could be used. Each of the mentioned techniques is used to achieve a free flowing powder with a (D50) average particle size from a few micrometers up to 200 μm.

It is further preferred that step g) comprises repulpation, more preferably the repulpation is with demineralized water.

Final step g) of the process of the invention may thus comprise
several filtration steps, preferably two or more steps, followed by salts washing and later repulpation in demineralized water or an acid solution in demineralized water, while such repulpation is followed by filtration and salts washing,
modification of geopolymer or geopolymer composite in filtration and/or repulpation by a suitable acid or via ion exchange using a suitable water-soluble salt, and
final repulpation of washed and/or modified geopolymer or geopolymer composite and subsequent spray drying to obtain a powder.

Advantageously, dissolvers with high speed and mixing intensity up to 2000 rpm are used for any dealkalization and repulpation, to better remove metal cations from the geopolymer matrix.

The final step g) may involve obtaining powder of geopolymer or of geopolymer composite, via spray drying of a water dispersion.

Depending on the used ions, a final modified geopolymer or modified geopolymer composite could be an athermanous additive, a antimicrobial agent, a heavy metal scavenger from water, a humidity absorbent, an oil absorbent, an organic solvents absorbent, a catalyst for e.g. hydrogenation or dehydrogenation, a rheology modifier, a dye enhancer or a hydrophilic property enhancer for fibres in particular, a filler, a flame retardant, or a conducting additive. More properties are possible and can be achieved through choice of the particular modifier.

In step e) of the process according to the invention, there are two alternatives, namely
e1) decantation, or
e2) adding of an organic phase, emulsifying, and stripping of the organic phase.

Generally, geopolymerization velocity can be increased if the aqueous sol-gel dispersion (embodiment I) or the emulsion (embodiment II) is mixed at an overpressure pressure and at an elevated temperature in the range of 20 to 200° C., preferably in the range of 30 to 150° C.

In the first alternative, the process of the invention includes step e1), decantation. In this preferred alternative embodiment e1), the process preferably comprises
e1a) applying high shear mixing and ultrasound with high energy, to induce cavitation,
e1b) optional addition of acid, preferably addition of acid,
e1c) decantation,
e1d) optional membrane filtration, and precipitate cake washing.

In step e1a), dispersing of geopolymer or geopolymer composite sol-gel in water can be performed with the use of high shear homogenization and ultrasound, with a frequency in the range from 10 Hz to 100 kHz.

It is further preferred in this first alternative embodiment that step e1a) comprises addition of one or more surfactants, preferably the surfactant is an ionic surfactant.

Optionally, step e1a), whether with addition of surfactant or without surfactant, may involve reducing the pH value with acid, such as hydrochloric acid, fluoric acid, bromic acid, sulphuric acid, phosphoric acid, nitric acid, carbonic acid or acetic acid, preferably hydrochloric acid.

In the second alternative embodiment of the process of the invention, the process includes step e2), namely adding of an organic phase, emulsifying, and stripping of the organic phase, and the process preferably comprises
e2a) adding of an organic phase,
e2b) emulsifying the sol-gel,
e2c) applying high shear mixing and ultrasound with high energy, to induce cavitation,
e2d) steam stripping to remove the organic phase, and
e2e) dispersion of the geopolymer or the geopolymer composite in water, preferably deionized water.

It is further preferred in this second alternative embodiment that step e2b) comprises addition of one or more surfactants, preferably the surfactant is a non-ionic surfactant or an ionic surfactant containing a dication.

In this second alternative, step e2d) may comprise i) filtration of the emulsion, to prepare solvent (and surfactant, if present) for recovery, ii) subsequent suspension of the precipitated solid phase in water, and iii) stripping, to further purify the geopolymer or geopolymer composite.

Alternatively, step e2d) may comprise i) centrifuging, ii) decantation, and iii) stripping.

Preferably, the process proceeds as follows:

Mixing of the aluminosilicate component, e.g. a dehydroxylated kaolinite (metakaolin or metakaolinite) mixed, with furnace slag, or fly ash, or thermal silica, in a weight ratio range of from 10/1 to 10/9, preferably from 10/1 to 10/7 in a water alkali solution of silicate, generally sodium or potassium silicate, or in an alkaline solution prepared from water and sodium aluminate or sodium disilicate as starting materials. In the high speed mixing process according to the present invention, the dissolution and hydrolysis of the aluminosilicate component takes place in alkali solution and results in the formation of $[M_z(AlO_2)_x(SiO_2)_y.MOH.H_2O]$ gel. The dissolution time depends on amorphous silica content in aluminosilicate component, fly ash and other additives, temperature as well as type of mixing. The polymerization can be described by the following equations:

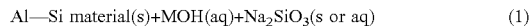

$$Al\text{—}Si\ material(s) + MOH(aq) + Na_2SiO_3(s\ or\ aq) \quad (1)$$

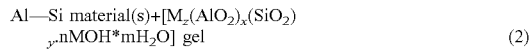

$$Al\text{—}Si\ material(s) + [M_z(AlO_2)_x(SiO_2)_y.nMOH*mH_2O]\ gel \quad (2)$$

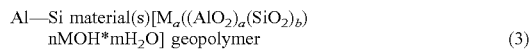

$$Al\text{—}Si\ material(s)[M_a((AlO_2)_a(SiO_2)_b)\ nMOH*mH_2O]\ geopolymer \quad (3)$$

The formation of gel is the dominant step in the geopolymerization reaction and it highly depends on the mixing type, which takes place after dissolution. The mixing is continued for a suitable time period to achieve the best dissolution of aluminosilicate and is preferably performed in a high speed, high shear mixer. The mixing time should be adjusted depending on the amount of loaded components and is preferably in a range of from 1 to 60 min.

It was found that high shear rate homogenizers with a speed above 20000 rpm are suitable to prepare very homogenous geopolymeric gels.

Conical screw mixers with the central screw agitator used in various applications are particularly suitable. These mixers have a conical shape and the rotor-stator agitator is positioned in the centre, while a side agitator is moving close to the mixer walls and cleans the wall's surface from the gel. In the production, a quick batching stage is performed, thus it is required to provide high speed mixing and to prepare the gel within 1 minute of even less. To achieve such conditions, a mixing speed in the range from 100 to 1000 rpm, preferably from 150 to 700 rpm, more preferably from 200 to 500 rpm may be used. The other favourable feature of such mixers is the possibility for a full opening of the bottom and emptying of the mixer off the very viscous melt.

The filled geopolymer in the form of a thixotropic gel is removed at high pressure from the conical homogenizer with a stream of water (embodiment I) or organic solvent (embodiment II), depending on the process with or without surfactant. Diluted gel (embodiment I) or the forming emulsion (embodiment II) is immediately transferred at high pressure with a pipe containing an in-line static mixer (to keep a turbulence effect) to the second homogenizer in which the particle phase is created, as described above.

A preferred particle size is an average particle size (D50) in a range of from 0.01 to 10 μm, D90 in a range of from 0.5 to 15 μm, D99 in a range of from 1 to 20 μm, D100 in a range of from 1.5 to 30 μm and D10 in range of 0.001 to 0.5 μm; or the particles can be milled only preliminarily to obtain particles sizes in a range of from 0.01 to 200 μm.

A further stage is the optional dealkalization step f), which consists of a reaction of metal cations which are present in the geopolymeric structure with the hydrochloric acid as present in the aqueous suspension. Other acids may be used, such as sulphuric acid, phosphoric acid, nitric acid, carbonate acid or acetic acid. The dealkalization process is performed in the jacketed agitated reactor equipped with a frame stirrer to avoid material sticking to the reactor walls, high shear dissolver to avoid agglomeration, thermocouple, pH and ion conductivity meter. A mixing speed in the range of 100 to 1000 rpm is used.

As a first part of this step f), process water with a conductivity below 1000 μS/cm, preferably below 500 μS/cm, and more preferably below 300 μS/cm or demineralized water with conductivity below 5 μS/cm, and geopolymer or geopolymer composite powder (with a particle size of from 0.01 to 200 μm) are poured into the reactor while stirring vigorously. A suitable mass ratio of geopolymer or geopolymer composite powder to water is in the range from 1.0:0.5 to 1:10, more preferable from 1:1 to 1:5 and most preferable from 1:2 to 1:3.

The second part of step f) is the addition of concentrated hydrochloric acid to the mixture, preferably about 30% concentrated. Before the acid addition, the pH value resulting from the addition of geopolymer or geopolymer powder is in the range of 10-12, more preferably the pH value is in the range of 11-12 and conductivity of approx. 9000 to 12000 μS/cm. After addition of hydrochloric acid and a reaction time of about 1 h, the resulting pH value is in a range of 3-4 and conductivity increases significantly, to 40,000 to 90,000 μS/cm, more preferably from 50,000 to 80,000 μS/cm. The dealkalization process is typically performed at a temperature in the range of 20-100° C., more preferable of 40-90° C. and most preferable of 60-80° C. The temperature increases after acid treatment, and then it decreases gradually.

After dealkalization, the resulting viscous suspension, having a temperature of 60-80° C., is pumped to the first step of filtration. The amount of process or demineralized water to wash the filtrated cake is in the range of 1.5 to 5.0 mass excess per weight of the mass in the filter press. Filtration is continued, until the pressure inside the press rises to the level of 4 to 6 bar, preferably 5 bar. The starting filtrate's pH value is the range of 3 to 5 and conductivity from 30,000 to 80,000 μS/cm. Filtration is continued over a minimum of 20 minutes and after this time, the filtrate's pH value increases to 6-7 and conductivity decreases to below 500 μS/cm, preferably below 400 μS/cm, which is recognized as the washing end, thus the membrane squeeze is applied, preferably with a pressure in the range from 12 to 20 bar, more preferably from 15 to 18 bar. The precipitated cake, with a dry mass content in the range of 50-65 wt. %, preferably 55-60 wt. %, falls to the screw granulator hopper after press release and is granulated to the small pieces and transported by the belt conveyer to the repulpation stage. The filtrate from the first step filtration is directed to the desalination process, to produce demineralized water, and back to the repulpation stage.

Preferably, the repulpation of the granulated cake is in a demineralized weak water solution of hydrochloric acid. Other acids or salts e.g. phosphoric acid, ammonium polyphosphate, ammonium bicarbonate, magnesium sulfonate can be used. A suitable concentration of acid in the water is in the range from 0.01 to 10 wt. %. The mass ratio of water to the precipitate is between 1:1 to 1:5. The process is conducted in a high shear dissolver with an agitation speed above 700 rpm. Repulpation is continued for approx. 1 h, to have a long enough time for the contact of acid with the particles of geopolymer or geopolymer composite. After the specified time, the suspension is transferred to the second filtration step g).

A second step membrane filter press filtration is preferably coupled with a vacuum cake drying. Filled geopolymer slurry after repulpation is fed to the filter press and cloudy filtrate is recirculated to the feeding spigot. A clean filtrate is directed to a waste stream for desalination process or could be used in the dealkalization. Again, filtration is finalized when the inside press pressure reaches from 4 to 6 bar. The filtrate has a pH in the range of 6-7 and a conductivity below 300 µS/cm.

Next, the filter cake is washed with demineralized water, in order to remove any remaining salts. The step is finished when the ion conductivity of the filtrate is below 100 µS/cm and at a pH value between 6-8, which takes a minimum of 20 min. The membrane squeeze is necessary to decrease the water content in the filter cake below 50 wt. %, preferably below 40 wt. %. Then, the cake (which is characterized by a solid mass content of about 55-60 wt. %) is heated above 100° C., preferably above 110° C., and steam and vacuum drying are applied in order to achieve a water content in the filter cake below 10 wt. %. The sodium content after dealkalization, repulpation, salts washing and filtration is much below 1000 ppm.

The salts elution process from the cake may be performed at a higher temperature, e.g. 40-90° C., in order to accelerate cations diffusing from the geopolymer composite. The elution process can be performed at a temperature in a range of from 5° C. to 100° C., preferably from 20° C. to 90° C., in particular from 30° C. to 80° C. When increasing the temperature by 20° C., the elution process can be shortened in time by about 50%, especially when the process temperature is in a range of from 30° C. to 80° C., in particular 40° C. to 70° C.

The geopolymer's matrix has a strong ability to be an ion exchange material. The negative charge in the amorphous structure of geopolymers is not localized and is more or less uniformly distributed in the framework. Charge-balancing cations can act as fully hydrated and mobile or as unhydrated and coordinated to oxygen atoms. The main factors determining the geopolymer's preference for exchanging a cation over another one are ionic radius, hydration energy, and locations of cations. Therefore, geopolymer cationic exchange capacity allows for a wide range of chemical and physical modification, in order to change thermal and morphological properties. The geopolymer of geopolymer composite could be modified by washing with salt or acids water solutions before membrane squeezing and vacuum drying, in order to incorporate proper cations to increase self-extinguishing properties. It was surprisingly found that geopolymer composite, modified with phosphoric acid or organic, inorganic phosphoric acid esters or polyesters or their salts e.g. ammonium polyphosphates (APP), triethyl phosphate, triphenyl phosphate allows to decrease or even fully dispense with halogenated flame retardants in expanded vinyl aromatic polymer foams. The specific salt for the ion exchange, or the specific acid water solution to modify the geopolymer or geopolymer composite, could be used with a concentration in the range of 0.01 to 20%, preferably 0.05 to 15%, more preferably from 1 to 10%.

The drying of precipitate at the end preferably takes place at a higher temperature, such as above 100° C. (to provide quick evaporation of water, 100 to 250° C. is preferred) and a vacuum, preferably vacuum means low pressure at a level of 0.2 mbar. After drying, the cake is preferably deagglomerated by the impact mill, preferably with a slow speed feeding and high speed of the rotor pin in the range of 1000 to 1000 rpm, preferably from 5000 to 8000 rpm, to have a preferred average particle size (D50) in a range of from 0.01 to 10 µm, D90 in a range of from 0.5 to 15 µm, D99 in a range of from 1 to 20 µm, D100 in a range of from 1.5 to 30 µm and D10 in range of 0.001 to 0.5 µm; or the particles can be milled only preliminarily to obtain particles sizes in a range of from 0.01 to 200 µm.

Instead of an impact mill, jet milling could be used the decrease particle size to the minimum as obtained from the water dispersion or emulsion process.

Optionally, the dispersion of geopolymer or geopolymer composite could be spray dried. Preferably, a drier equipped with a spray nozzle is used, to provide a more narrow particles size distribution. The advantage of using such drying is that it makes the process simpler because there is no need for a final filtration, including vacuum drying. Also, the milling stage is not mandatory in this case because material is not agglomerated during precipitated cake formation. However, if needed, a further particle size decrease is possible by having as last step a jet milling process. In this way, agglomerates having a size in the range of 10-200 µm can ultimately be destroyed. In the spray drying process, a hot drying medium may be used, preferably hot dry air with a temperature in the range from 150 to 400° C.

Geopolymer Composite

The geopolymer composite prepared in accordance with the invention is preferably synthesized from metakaolin (geopolymeric binder based on fire clays—metaclay) and sodium or potassium polysilicate solution, preferably a sodium solution may be used, and/or carbon blacks and/or petroleum cokes and/or graphite and/or chamotte and other crystalline fire clays as cross linking precursors and/or titanium dioxide, and/or barium sulphate and/or synthetic rutile and/or ilmenite and/or perovskite and/or fumed silica and/or fly ashes and/or hydromagnesite/huntite mineral can be used as well.

The geopolymer composite can e.g. contain up to 70% of athermanous additive from the group of carbon-based additives, such as carbon blacks and/or petroleum cokes and/or graphite and/or graphene oxide and/or nano-graphite. Various types of carbon black, petroleum coke, graphite, graphene oxide and nano-graphite can be added. In addition, it is possible to incorporate graphitized carbon black together with synthetic or natural graphite or alone. The concentration of additives in the geopolymer composite depends on the geopolymer composite's viscosity, and this is related to the (athermanous) additive's particle size, and the BET surface area of the particular additive.

The geopolymer composite powder is preferably characterized by the following parameters:
- a mean particle size distribution, as measured by laser diffraction, specifically using a Malvern Mastersizer apparatus according to the standard ISO 13320-1. The mean particle size should be in the range of from 0.01 to 200 µm, preferably of from 0.1 to 50 µm, more preferably of from 0.5 to 30 µm, and especially of from 1 to 25 µm.
- a BET surface in the range from 0.01 to 10,000 m$^2$/g, as measured by a Gemini 2360 surface area analyzer from Micromeritics, according to ISO 9277:2010.

a moisture content in the range of from 0.1 to 10% per total mass of geopolymer composite.

Kaolinite and Metakaolin

Kaolinite used according to the present invention is a clay mineral composed of aluminosilicate oxides with the formula $Al_2O_3.2SiO_2.2H_2O$. It is a layered silicate mineral, with one tetrahedral sheet linked through oxygen atoms to one octahedral sheet of alumina octahedra.

Endothermic dehydration of kaolinite begins at 550-600° C., producing disordered metakaolin, but continuous hydroxyl loss is observed up to 900° C.

The calcination of kaolin clay at 550-900° C., preferably 600-800° C. and more, more preferably 600-700° C., results in metakaolin that is preferably used according to the invention.

The metakaolin used according to the invention is preferably composed of:
aluminium oxide in an amount in the range of 25-50 wt. %, preferably 30-45 wt. % and more preferably 33-43 wt. %.
silicon dioxide in an amount in the range of 35-70 wt. %, preferably 50-65 wt. % and more preferably 55-60 wt. %.

Titanium Dioxide

Titanium dioxide occurs in form of three common crystalline phases, namely rutile, anatase and brookite. Rutile is the most stable form, while anatase and brookite slowly convert to rutile upon heating above 550° C. and 570° C. All three forms of titanium dioxide have six co-ordinated titanium atoms in their unit cells. Rutile and anatase structures are tetragonal. Titanium dioxide is characterized by its excellent processing properties, ease of wetting and dispersion. Moreover, it is able to absorb infrared radiation, thus in this manner was used in the synthesis of geopolymer composite of the invention, to decrease thermal conductivity of the expanded vinyl aromatic polymer (as measured according to ISO 8301).

The titanium dioxide preferably used in the present invention has a $TiO_2$ content in the range of 70.0-99.9 wt. %, as measured according to standard PT-5006, preferably 85.0-99.0 wt. %, more preferably from 90-98 wt. %. The total $Al_2O_3$ and $SiO_2$ content is in the range of 0.1 to 30 wt. %, preferably in the range of from 1 to 10 wt. %, more preferably of from 3-5 wt. %, as measured according to PT-5003 and PT-5002 standards. The density is preferably 1-7 $kg/dm^3$, as measured according to DIN ISO 787 standard, preferably 2-6 $kg/dm^3$, more preferably 3-5 $kg/dm^3$. The average particle size is in the range of 0.01-100 μm, preferably in the range of 0.1-30 μm, more preferably 0.5-25 μm, as measured by a Malvern Mastersizer apparatus according to the standard ISO 13320-1.

Ilmenite

Ilmenite is a titanium-iron oxide mineral ($FeTiO_3$), weakly magnetic, considered as the most important ore of titanium. Ilmenite most often contains appreciable quantities of magnesium and manganese and the full chemical formula can be expressed as $(Fe, Mg, Mn, Ti)O_3$. Ilmenite crystallizes in the trigonal system. The crystal structure consists of an ordered derivative of the corundum structure.

The ilmenite as used according to the invention preferably has a $TiO_2$ content in the range of from 10 to 70 wt. %, preferably of from 30 to 50 wt. %, more preferably of from 40 to 45 wt. %. It is preferred that the total Fe content is from 5 to 50 wt. %, preferably from 20 to 40 wt. %, more preferably from 33 to 38 wt. %. The content of $SiO_2$, MnO, MgO, Cao, $Al_2O_3$ and $V_2O_5$ is in the range of from 0.1 to 20 wt. %, preferably in the range of from 1 to 15 wt. %, more preferably in the range of 5 to 10 wt. %. The density is preferably from 2 to 6 $kg/dm^3$, as measured according to DIN ISO 787, preferably 3 to 5 $kg/dm^3$. The average particle size is in the range of from 0.01 to 100 μm, preferably in the range of from 0.5 to 30 μm, as measured by laser diffraction, using a Malvern Mastersizer apparatus according to ISO 13320-1.

Rutile

Rutile is a mineral composed primarily of titanium dioxide ($TiO_2$). Natural rutile may contain up to 10% of iron and significant amounts of niobium and tantalum. Rutile crystallizes in the tetragonal system.

The titanium dioxide used in the present invention preferably has a $TiO_2$ content in the range of from 70.0 to 99.9 wt. %, preferably of from 85.0 to 99.0 wt. %, more preferably from 90 to 93 wt. %. The $SiO_2$ content is in the range of 0.1 to 10 wt. % preferably in the range from 1 to 5 wt. %, more preferably from 2 to 4 wt. %. The density is from 1 to 7 $kg/dm^3$, as measured according to DIN ISO 787, preferably 2 to 6 $kg/dm^3$, more preferably 3 to 5 $kg/dm^3$. The average particle size is in the range of 0.01 to 100 μm, preferably in the range of 0.1 to 30 μm, more preferable is range of 0.5 to 25 μm, measured by laser diffraction, using a Malvern Mastersizer apparatus according to the ISO 13320-1.

Perovskite

A mineral of the general formula $ABX_3$ is preferably present, A and B being cations and X being anions, wherein the mineral has perovskite crystal structure (in the following "mineral having perovskite structure", or "perovskite"). This type of additive reduces flame development by the creation of char with higher viscosity and thus reduces dripping and flaming.

The perovskite as preferably used in accordance with the invention has the following specific properties:
a crystalline structure with the general formula $ABX_3$ where A and B are two cations of different sizes and X is an anion that bonds to both, the A atoms are larger than the B atoms, and its ionic radii close to that on the anion X thus they can form together a cubic (orthorhombic) close packing with space group Pm3m. In the structure the B cation is 6-fold coordinated and A cation 12-fold coordinated with the oxygen anions. For the stoichiometric oxide perovskite, the sum of oxidation states of A and B cations should be equal to six.

Preferably, A is selected from the group consisting of Ca, Sr, Ba, Bi, Ce, Fe, and mixtures thereof. Moreover, the A atom can be represented also by hybrid organic-inorganic groups, e.g. $(CH_3NH_3)^+$.

The B atom is preferably represented by Ti, Zr, Ni, Al, Ga, In, Bi, Sc, Cr, Pb as well as ammonium groups. The X atom is preferably represented by oxygen or halide ion, or mixtures thereof.

Among the most important representatives of minerals having perovskite structure are dielectric $BaTiO_3$, high-temperature semiconductor $YBa_2Cu_3O_7x$, materials exhibiting magneto-resistance $R_{1-x}A_xMnO_3$, where $R=La^{3+}$, $Pr^{3+}$ or other earth ion, $A=Ca^{2+}$, $Sr^{2+}$, $Ba^{2+}$, $Bi^{2+}$, $Ce^{2+}$, and multiferroic materials.

Perovskites have large reflectance properties in the broad wavelength and a high optical constant, even in the far-infrared region. Hence, perovskites are infrared reflective materials that reflect infrared rays included in sunlight or the like and reduce the level of absorbed infrared rays.

Perovskites according to the invention are preferably characterized by:

a BET surface size in the range of 0.01 to 100 m²/g as measured according to the ASTM C1069 and ISO 9277 as explained above. The BET active surface area is preferably in the range of 0.05 to 50 m²/g and more preferable in the range of 0.1 to 15 m²/g.

a particle size in the range of 0.01 to 100 μm as measured according to the standard procedure using a Malvern Mastersizer 2000 apparatus. The particle size is preferably in a range of 0.1 to 30 μm, more preferably in the range of 0.5 to 25 μm.

Sodium Activator (Glass Water) as Preferred Alkaline Silicate

Glass water is a water soluble alkali metal silicate with a certain molar ratio of $M_2O:SiO_2$ (M representing Na or K, or a mixture of Na and K), corresponding to the chemical formula $M_2O:2SiO_2*nH_2O$, n being comprised between 2 and 6. In the present invention, M is in one embodiment preferably Na.

Alternatively, M is K. Although potassium silicate is more expensive than sodium silicate, the properties of the geopolymers prepared with potassium silicate are much better than those obtained with sodium silicate.

In the present invention, the molar ratio of $M_2O:SiO_2$ is preferably comprised between 0.2 and 0.8. In the following examples, the alkali metal silicate solution contains 20 to 30 wt. % by weight of $SiO_2$, 15 to 26 wt. % of $K_2O$ or $Na_2O$, and 45 to 65 wt. % by weight of water. The solution may be prepared in advance or may result from the dissolution of solid (powdered) alkali silicate present in the mix, with added water.

Calcium Silicate as Part of or as the Aluminosilicate Component

Calcium silicates with Ca/Si atomic ratio equal to or greater than 1, such as wollastonite $Ca(SiO_3)$, gehlenite $(2CaO.Al_2O_3.SiO_2)$ r, akermanite $(2CaO.MgO.2SiO_2)$ are preferred.

When the particles of these substances are exposed to an alkaline solution (NaOH or KOH), very rapid desorption of CaO occurs, so that the Ca/Si atomic ratio becomes less than 1 and is closer to 0.5. There is an in situ production of soluble calcium disilicate $Ca(H_3SiO_4)_2$ that contributes to the geopolymeric reaction. Industrial by-products and high-temperature residues contain essentially the basic silicates gehlenite, akermanite and wollastonite, and are thus very suitable. They are found in blast furnace slag.

Under the microscope, the hardened geopolymer examples of cement show that the finer slag grains have disappeared. One only sees an imprint of their initial shape, in the form of a skin probably made up of akermanite, which did not react.

This process is very regular and may be complete within 30 min. However, when the slag has a very fine grain size, such as 400 m²/kg or greater (this corresponds to a mean grain size d50 of 10 μm), the hardening of geopolymer composite is too fast. Now, in the prior art, the blast furnace slag used has a specific surface area in the range of 400 to 600 m²/kg, i.e. d50 less than 10 μm, such as in WO 98/31644.

In the Forss patents, the specific surface area of the slag is greater than 400 m²/kg, preferably comprised between 500 and 800 m²/kg. This is not the case in the present invention where, preferably, 5 to 15 parts by weight of blast furnace slag with a specific surface area less than 380 m²/kg or d50 between 15 and 25 μm are used. This results in mixtures with a pot-life ranging between 1 and 4 hours.

In general, use of calcium silicate improves the geopolymer properties by better dissolution of metakaolinite in the sodium activator.

Carbon Black

The carbon black as used in geopolymer composite preparation according to the invention preferably has a BET surface, as measured according to ASTM 6556 standard, in the range of 5 to 1000 m²/g. The following carbon blacks within this BET surface area range can be characterized:

Furnace black, in which hydrocarbons are partially combusted and immediately quenched with water. The primary particle consists of several graphene like layers, which combine to form oval or spherical particles. The processing conditions influence the particle diameter. Primary particles combine, to form aggregates of different size and structure.

Acetylene black has a special importance in electrochemical applications and is produced by partial oxidation of acetylene gas at high temperature. The acetylene black shows high aggregate structure and crystal orientation.

Pure black, which is furnace black, graphitized in a second step by a continuous graphitization process in a fluidized bed. The graphitization rearranges the graphene layers into a graphitic structure and makes them highly conductive. Moisture pick-up is very limited and solvent absorption is small.

Lamp black is a type of carbon black obtained from the soot of burned fat, oil, tar, or resin. Lamp black is a soft brownish- or bluish-black pigment that is very stable and is unaffected by light, acids and alkalis. This black, amorphous, carbon pigment is produced by the thermal decomposition of 100% natural hydrocarbons. The traditional types of lamp black are the most diverse, because lamp black was produced by collecting soot from oil lamps. The material has irregular needles, crystals, shots, and flakes of 15 to 95 nm.

It is preferred in all aspects of the invention that:

the BET surface of the carbon black is from 5 to 200 m²/g, preferably from 10 to 150 m²/g, in particular from 15 to 100 m²/g, as measured according ISO 9477 standard.

the sulphur content of the carbon black is in the range of from 50 to 20.000 ppm, as measured according to standard ASTM D1619, preferably from 3.000 to 10.000 ppm.

the iodine number of the carbon black is from 10 to 100 mg/g, in particular from 20 to 80 mg/g, especially from 25 to 50 mg/g, as measured according to standard ISO 1304.

the oil number (OAN) of the carbon black is from 50 to 150 cc/100 g, especially 60 to 110 cc/100 g, measured according to ISO 4656.

the moisture content of the carbon black is from 0.2 to 1.5%.

the tinting strength of the carbon black is from 5 to 100%, preferably from 10 to 50% maximum, as measured according to ISO 5435.

Petroleum Cokes

Depending on purity, the conditions in the coker and the subsequent calcinations, a variety of different coke types can be produced. Typical coke products are needle coke, regular coke, and sponge coke. Needle coke consists of highly structured graphene layers. Regular coke consists of irregularly oriented graphene layers. Sponge coke is a coke with highly porous structure. It is preferred according to the present invention to use a coke for the preparation of geopolymer composite having a sulphur content in the range from 1 to 100 000 ppm, preferably 50 to 20 000 ppm, as measured according to ASTM D1619, and an ash content from 0.1 to 1%. In addition, preferably, the mean diameter size of coke particles should be in the range of 0.01 to 100 µm, more preferably in the range of 0.1 to 30 µm, suitably 0.5 to 25 µm.

To obtain favourable properties of geopolymer composite and expanded foam composite, the coke's further properties are preferably:
- an iodine number from 10 to 60 mg/g, in particular from 20 to 50 mg/g, especially from 25 to 40 mg/g, as measured according to standard ISO 1304.
- an oil number (OAN) from 10 to 150 cc/100 g, especially 20 to 100 cc/100 g, more preferably from 25 to 50 cc/100 g, as measured according to standard ISO 4656.
- a moisture content from 0.2 to 1.5%.
- a tinting strength from 1 to 100%, preferably from 5 to 50% maximum, as measured according to standard ISO 5435.

Chamotte

The chamotte preferably used according to the invention is preferably composed of:
- aluminium oxide in an amount in the range of 25 to 50 wt. %, preferably 30 to 45 wt. % and more preferably 33 to 43 wt. %.
- silicon dioxide in an amount in the range of 30 to 65 wt. %, preferably 40 to 60 wt. % and more preferably 50 to 55 wt. %.
- iron(III) oxide in an amount in the range of 0.1 to 4.5 wt. %, preferably 0.5 to 4.0 wt. % and more preferably 1 to 3 wt. %.
- calcium oxide and magnesium oxide in a total amount in the range of 0.1 to 3 wt. %.

It is preferred that the water absorption of chamotte as used according to the invention is 10 wt. % maximum, preferably lower than 7 wt. % and more preferably lower than 5 wt. %.

Moreover, chamotte used according to the invention preferably has a melting point of approximately 1780° C. Its thermal expansion coefficient is most preferably about 5.2 mm/m, and thermal conductivity (as measured according to ISO 8301) is about 0.8 W/(m·K) at 100° C. and about 1.0 W/(m·K) at 1000° C.

The chamotte used in this invention acts as a cross-linking precursor agent.

Fumed Silica

In the present invention, the term thermal silica fume designates an amorphous type of silica obtained by condensing of SiO vapours resulting from the very high temperature electrofusion of siliceous materials, generally at about 2000° C.; the said alkaline silicate is preferably obtained by dissolving the said thermal silica in a concentrated solution of NaOH and/or KOH.

In a preferred embodiment of the invention, the thermal silica fume is prepared by electrofusion of zircon sand. The obtained thermal silica fume preferably contains at most 10% by weight of $Al_2O_3$ and at least 90% by weight of $SiO_2$. It has a chemical formula between ($13Si_2O_5$, $Al_2O_2$) and ($16Si_2O_5$, $Al_2O_2$), representing an aluminosilicate oxide with Al in coordination (IV), with additional amorphous silica $SiO_2$. In the following part of this specification, the aluminosilicate oxide having the characteristics of this thermal silica is written as ($15Si_2O_5,Al_2O_2$), however, without excluding from the scope of the invention other thermal silica fumes with compositions containing at most 10% by weight of $Al_2O_3$ and at least 90% by weight of $SiO_2$.

The fumed silica used in this invention acts as a cross-linking precursor agent and viscosity modifier.

Huntite and Hydromagnesite

Huntite (magnesium calcium carbonate with the formula $Mg_3Ca(CO_3)_4$) and hydromagnesite (hydrated magnesium carbonate with the formula $Mg_5(CO_3)_4(OH)_2.4H_2O$) or their combination in certain ratios are used according to the invention as char promoting fire retardants. Huntite and hydromagnesite in accordance with the invention preferably have the following specific properties:
- a bulk density of from 0.24 to 0.36 kg/m³.
- a particle size in the range of from 0.01 to 100 µm, as measured according to the standard procedure using a Malvern Mastersizer 2000 apparatus. The particle size is preferably in the range of from 0.1 to 30 µm, more preferably in the range of from 0.5 to 25 µm.
- a BET active surface area preferably in the range of from 5 to 30 m²/g and more preferable in the range of from 10 to 20 m²/g.
- a char residue, at 1000° C., of over 35 wt. %, preferably over 45 wt. % and more preferable over 50 wt. %.
- a specific gravity in the range of from 2.32 to 2.66 g/cm³.
- a pH in the range of from 9 to 12.
- a hardness according to the Mohs scale of minerals in the range of from 2 to 3.
- an oil absorption in the range of from 23 to 39 ml/100 g.

Green Anthracite

Green anthracite is a compact variety of coal which is characterized by a low content of volatile parts, high content of carbon and large heat of combustion. Anthracite is a black or dark grey material with metalloid luster. Anthracite is formed as a result of very high temperatures and very high pressure, during diagenetic and metamorphic processes.

The green anthracite used according to the present invention preferably has a carbon content in the range of from 70 to 97 wt. %, more preferably from 92 to 95 wt. %. The ash content is in the range of from 1 to 20 wt. %, more preferably from 5 to 10 wt. %. The sulphur content is in the range of from 0.2 to 5.0 wt. %, more preferably from 0.6 to 2 wt. %. Content of volatile parts is in the range of from 1 to 8 wt. %, more preferably from 2.5 to 5 wt. %. The heat of combustion is in the range of from 20 to 30000 kJ/kg, more preferably from 30 to 29000 kJ/kg. The green anthracite has amorphous, disordered structure devoid graphitic structures.

Gas Calcinated Anthracite

Gas calcined anthracite used according to the present invention is produced from raw anthracite by calcination in vertical shaft furnaces at a temperature in the range of from 1100 to 1300° C., which results in a very homogeneous end product.

The gas calcinated anthracite has a carbon content in the range of from 90 to 99 wt. %, more preferably from 95 to 99 wt. %. The ash content is in the range of from 1 to 20 wt. %, more preferably from 3 to 7 wt. %. The sulphur content is in the range of from 0.1 to 1.5 wt. %, more preferably from 0.2 to 1.0 wt. %. In the calcination process, irregular carbon structures, or carbon based molecules, become more ordered carbon layers and exhibit graphitic structures.

Electrically Calcined Anthracite

Electrically calcined anthracite is a carbonaceous material manufactured by heat treating high grade anthracite coal in an electrically "fired" calcining furnace. Anthracite is heated to temperatures of in the range of from 1900 to 2200° C., which results in some development of a graphitic structure in the product.

Electrically calcined anthracite has a carbon content in the range of from 90 to 99 wt. %, more preferably from 95 to 99 wt. %. The ash content is in the range of from 1 to 20 wt. %, more preferably from 3 to 8 wt. %.

The sulphur content is in the range of from 0.1 to 1.5 wt. %, more preferably from 0.2 to 0.8 wt. %. Content of volatile parts is in the range of from 0.5 to 5.0 wt. %, more preferably from 1 to 3 wt. %. In the calcination process, irregular carbon structures, or carbon based molecules, become more ordered carbon layers and exhibit graphitic structures.

Ammonium Polyphosphate

Ammonium polyphosphate is an inorganic salt of polyphosphoric acid and ammonia. The chain length (n) of this polymeric compound is both variable and branched, and can be greater than 1000.

In the solid state, the powder of APP can have a form with an average particle size (D50) in the range of 1 to 30 µm.

Short and linear chain APP (n<100) are water sensitive (hydrolysis). Short and linear chain APP will begin to decompose at temperatures above 150° C.

Long chain APP with "n" value higher than 1000 starts to decompose at temperatures above 300° C. to polyphosphoric acid and ammonia. Its crosslinked/branched structure shows a very low water solubility (<0.1 g/100 ml).

APP is mainly used in polyolefin (PE, PP), thermoset resins such as epoxy resins, polyurethane, unsaturated polyester phenolic resins and others. APP is an non-toxic, environmentally friendly material and it does not generate additional quantities of smoke. A synergistic effect of geopolymer and APP, geopolymer composites and APP and geopolymer APP on improved self-extinguishing properties of expanded vinyl aromatic polymer foam was found.

It is most preferred that the geopolymer or geopolymer composite comprises a certain amount of water, preferably from 0.5 to 20 wt %, more preferably from 1 to 15 wt %, in particular from 2 to 10 wt %.

The water content of the final (modified) geopolymer or (modified) geopolymer composite as produced according to the present invention is alternatively preferably in a range of from 1 to 50 wt. %, preferably 2 to 30 wt. %, more preferably 3 to 20 wt. %.

(Modified) geopolymer or (modified) geopolymer composite as produced according to the present invention may be used together with brominated flame retardant. Because brominated flame retardants have limited compatibility with products having a certain sodium content, the sodium content of the (modified) geopolymer or (modified) geopolymer composite is therefore preferably less than 5000 ppm, more preferably less than 500 ppm, in particular less than 200 ppm, such as less than 100 ppm, or even less than 50 ppm, each calculated on dry mass.

If the (modified) geopolymer or (modified) geopolymer composite used/produced according to the present invention is not used together with brominated flame retardant, then the sodium content need not necessarily be low. In this embodiment, the sodium content of the (modified) geopolymer or (modified) geopolymer composite is preferably less than 50,000 ppm, more preferably less than 10,000 ppm, in particular less than 5,000 ppm, each calculated on dry mass.

II) Geopolymer or Geopolymer Composite

According to a second aspect, the invention relates to geopolymer or geopolymer composite, as obtainable according to the process of the first aspect of the invention.

According to the present invention, the process of embodiment I may be as follows:
i) mixing of an aluminosilicate component with an alkaline silicate solution, to form a sol-gel,
ii) optionally adding of second additive component, preferably nano-component to the sol-gel, to form a filled gel,
iii) mixing of the filled gel, to form filled geopolymer,
iv) adding water to form diluted gel, optionally adding surfactant, preferably ionic surfactant,
v) applying high shear mixing and ultrasound with high energy to induce cavitation,
vi) optionally modification subsequently with acid after step v) causing pH decrease and causing decantation,
vii) optionally to proceed an dealkalization,
viii) optionally membrane filtration and precipitate cake washing,
ix) optionally modification by acid in step vii) before or after precipitate cake washing,
x) optionally modification by ion exchange in step vii) before or after precipitate cake washing,
xi) repulpation step, preferably in demineralized water and subsequent optional modification with acid or salt, followed by membrane filtration,
xii) optionally vacuum drying step in the filter press,
xiii) optionally dry precipitate cake crushing and deagglomeration in the jet mill or impact mill,
xiv) Optionally spray drying of geopolymeric particles or geopolymeric particles composite to remove water without performing unnecessary agglomeration.

According to the present invention, embodiment II may proceed as follows:
i) mixing of an aluminosilicate component with an alkaline silicate solution, to form a sol-gel,
ii) optionally adding of second additive component, preferably nano-component to the sol-gel, to form a filled gel,
iii) mixing of the filled gel, to form filled geopolymer,
iv) adding water to form diluted gel,
v) emulsifying sol-gel in the organic phase, preferably with use of surfactant, preferably non-ionic surfactant or at least ionic surfactant containing dication,
vi) applying high shear mixing and ultrasound with high energy to induce cavitation,
vii) steam stripping to remove organic phase,
viii) dispersion of geopolymer or geopolymer composite phase in water, preferably deionized water,
ix) optionally modification subsequently with acid after step viii),
x) optionally membrane filtration and precipitate cake washing,
xi) optionally modification by acid in step ix) before or after precipitate cake washing,
xii) optionally modification by ion exchange in step g) before or after precipitate cake washing,
xiii) repulpation step, preferably in demineralized water and subsequent optional modification with acid or salt, followed by membrane filtration,
xiv) optionally vacuum drying step in the filter press,
xv) optionally dry precipitate cake crushing and deagglomeration in the jet mill or impact mill,
xvi) Optionally spray drying of geopolymeric particles or geopolymeric particles composite to remove water without performing unnecessary agglomeration.

Generally, in the first step a), the high speed mixing and dissolution of amorphous phase of aluminosilicate precursor and/or phosphoaluminate component in the alkaline solution prepared from water solution of sodium hydroxide and silicon dioxide (water glass) or water solution of sodium disilicate or water solution of sodium aluminate with or without addition of phosphoaluminate. In particular, the precursor could be dehydroxylated kaolinite, metakaolin or metakaolinite, but also fly ash, furnace slag, red mud, thermal silica, fumed silica, halloysite and the mixture thereof. After activation and dissolution, the ortho-sialate monomer [(OH)$_3$—Si—O—Al—(OH)$_3$] polycondensates and forms sol-gel, so called "gel". The mixing is in step d) continued, followed by addition of second component which could be coke, anthracite, graphene oxide, metal oxides, metal sulfides or metals or mixture thereof in micro or in nano powder forms. During step b), water can be introduced as viscosity modification additive and/or silane and/or latex as adhesion modifiers. Optionally, if the second component is in nano form, its dispersion in water could be made and could in this form be added to the forming geopolymer sol-gel in step b). The mixing is performed for a preferred time period of a minimum of 15 minutes, maximum 24 h, more preferably about 1 h. During the mixing in step d), water can be introduced as viscosity modification additive, in d) more water is added to dilute the gel in mass ratio to the gel from 1/1 to 1/20, preferably from 1/2 to 1/10. The high shear mixing in steps a) and c) is applied with the use of rotor stator homogenizer with preferred speed in the range of 5000 to 30000 rpm, more preferably from 10000 to 25000 rpm.

In step c), excess of water is added and the high shear mixing is continued. Together with water a surfactant, preferably ionic surfactant such us sodium dodecyl sulfate (SDS) could be added, to improve formation of smaller and more uniform particles. With suitable water dilution of the sol-gel, the pH is increased to involve gel phase hydrolysis, the high shear mixing in step d) helps to separate the liquid phase from the gel. An even better phase separation and formation of uniform particle could be induced by the application of ultrasonic energy, thus it may be applied in step e). A broad range of frequencies may be used, starting from 10 Hz and up to about 50 kHz, in particular about 35 kHz. Hydrolysis of the solid phase from the gel could be accelerated by the addition of acid, preferably hydrochloric acid and causing more rapid decantation involved by pH reduction in step e).

Optional step f) is a dealkalization, to remove cations from the geopolymer matrix, preferably by addition of concentrated hydrochloric acid to the geopolymer or geopolymer composite particles suspended in water. The reaction is preferably performed within 1 h and in a temperature range of 50–90° C. in a heated/cooled dissolver, with an agitation speed in the range of 500 to 1500 rpm. The reaction results in release of hydrogen sulfide and sulphur dioxide as well pH change in the range of 3-13; additionally, the viscosity of the slurry increases significantly, due to a change of the particle surface and geopolymer interaction with water.

In the process to prepare the geopolymer or geopolymer composite powder according to embodiment (II), an emulsion of geopolymer or geopolymer composite sol-gel is involved, as described by the following process steps:
i) mixing of an aluminosilicate component with an alkaline silicate solution, to form a sol-gel,
ii) optionally adding a second additive component, preferably a nano-component, to the sol-gel, to form a filled gel,
iii) mixing of the filled gel, to form filled geopolymer,
iv) adding water to form diluted gel,
v) emulsifying the sol-gel in an organic phase, preferably with use of surfactant, preferably a non-ionic surfactant or at least ionic surfactant containing dication,
vi) applying high shear mixing and ultrasound with high energy, to induce cavitation,
vii) steam stripping to remove the organic phase,
viii) dispersion of the geopolymer or geopolymer composite phase in water, preferably deionized water,
ix) optionally modification subsequently with acid after step viii),
x) optionally membrane filtration and precipitate cake washing,
xi) optionally modification by acid in step vii) before or after precipitate cake washing,
xii) optionally modification by ion exchange in step vii) before or after precipitate cake washing,
xiii) repulpation, preferably in demineralized water and subsequent optional modification with acid or salt, followed by membrane filtration,
xiv) optionally vacuum drying in the filter press,
xv) optionally dry precipitate cake crushing and deagglomeration in a jet mill or impact mill,
xvi) Optionally spray drying of geopolymeric particles or geopolymeric particles composite to remove water without performing unnecessary agglomeration.

The main difference between embodiment I and embodiment II is in the solid phase formation, to prepare particles from the geopolymer or geopolymer composite sol-gel.

In step e2), i.e. according to embodiment II, a mixture of an organic solvent with surfactant or a surfactant mixture and/or stabilizers is prepared. Stabilization using surfactants is preferred, since W/O emulsions are usually unstable systems. Ionic as well as non-ionic surfactants soluble in the organic phase (oil or organic solvent) may be used. However, better results are observed when using non-ionic emulsifying agents. A factor playing a great role in the stability of the final emulsion is the ratio between organic phase and surfactant or surfactants mixture as well as the ratio between surfactants themselves (in case two or more surfactants are used in admixture). Usually, from 0.1 up to 50 wt. % surfactant per organic phase is recommended, preferably from 5 to 30 wt. %. In order to introduce the geopolymer or geopolymer composite gel (as initially formed in steps a-b) as a water-dispersed phase) into a continuous organic solvent phase, the geopolymer gel in step v) is diluted with water, preferably deionized water. The water-diluted geopolymer or geopolymer composite may in step e2) be dropped into the mixture of organic solvent and surfactant.

Preferably the following non-polar solvents could be used as organic phase: pentane, cyclopentane, hexane, cyclohexane, benzene, toluene, 1,4-dioxane, chloroform, diethyl ether, dichloromethane. It is preferred to use the following non-ionic surfactants such as those from the group of polysorbates, poloxamers, glycerol stearates, sorbitan stearates, alkyl polyglycosides, cocamides, maltosides, monolaurin's, glucosides, nonoxynols, glycerides, derivatives of cetyl alcohols, ethoxylates. Ionic surfactants, such as dicationic ones used for formation of W/O emulsions, may be used, preferably calcium-based surfactants such as calcium dodecyl sulfonate or their mixtures with sodium based surfactants.

It was found that with the use of the emulsion process according to embodiment II, it is possible to prepare even finer particles, in comparison with the water dispersion method according to embodiment I. The same dispersing methods are used in step f) which could be started before addition of diluted geopolymer of geopolymer composite gel. High speed homogenization typically uses a rotor-stator homogenizer with a rotating speed preferably above 10,000 rpm, more preferably above 20,000 rpm. Ultrasound is preferred, to significantly decrease the size of particles, especially below 1 μm, starting with a frequency of 10 Hz, preferably 35 Hz. If a particle size below 0.5 μm is desired, a frequency of above 30 kHz should be used.

In step e), it is important to remove the organic phase (solvent with surfactant) from the geopolymer or geopolymer composite particles. For this reason, the steam stripping process is useful. The emulsion is injected to the stripping column from the side top of column, the overheated steam with temperature in the range of 150-350° C. is injected from the bottom side. The overheated steam is heating the emulsion and thus volatilizes the low-boiling phase and creates turbulence in the solid part of the emulsion. This effect is created in counter-current of feed emulsion and steam. A nonvolatile phase (geopolymer or geopolymer composite) is washed with hot water in the bottom section of the column. The volatile phase containing water, organic solvent and surfactant (which degrades) is removed through the top of column. The gases are condensed and form a two-phase mixture. The solvent is then distilled and can be reused in the emulsification stage. The water, with residues of surfactant and its degraded residues, is directed to the waste water system including decantation and reversed osmosis. If necessary, a second stripping could be performed, to reduce the content of solvent and surfactant to a minimum. The water paste of geopolymer or geopolymer composite may then be dispersed in water, to perform process steps f) and g).

The advantages of the present invention become apparent from the following examples. Unless indicated otherwise, all percentages are given by weight.

Moreover, whenever reference is made in the description to an amount of any additive "by weight of polymer", this refers to the amount of the additive by weight of polymer component inclusive of (solid and, if any, liquid) additives, but exclusive of propellant.

EXAMPLES

The following examples show that geopolymer or geopolymer composite can be obtained with a much simpler method than presented before, without the need for curing, drying and milling steps.

Example 1

In this example, the geopolymer particles were prepared via sol-gel emulsification.

8.5 kg of thermal silica (Hueber), 10.6 kg sodium aluminate component (Chemexis) and 12 kg deionized water were placed in a vessel. The composition was mixed at room temperature for 60 minutes at 700 rpm, until the paste was homogenous. Afterwards, 27 kg of deionized water was added to the composition. Meanwhile, a solution of 150 kg cyclohexane and 50 kg polyethylene glycol sorbitan monostearate (Polysorbate 60) was prepared, and after ca. 30 minutes of mixing at room temperature the solution was subjected to sonification and heated to 40° C. In the next step, prepared geopolymer gel was poured into the cyclohexane and polyethylene glycol sorbitan monostearate (Polysorbate 60) solution, at a rate of 10 dm$^3$/min, under continuous mixing at 700 rpm and at a temperature of 40° C. The resultant emulsion was maintained under mixing for another 15 minutes, at a temperature of 40° C., until a significant increase in viscosity occurred. In order to perform particle size analysis, 3 g sample was rinsed with 150 cm$^3$ of ethanol. The resultant product was mixed with 20 g of water and subjected to a particle size measurement using wet method. Dynamic light scattering experiments indicated that the emulsion had a particle size distribution 0.6 μm (FIG. 1). In the next step, the emulsion was centrifuged, decanted in water, and filtrated. The precipitate was suspended in water, steam stripped from the rest of organic solvent in a stripping column, and then dispersed in water for further processing. A sodium content of 200 ppm was analysed in the final powder. Finally, after a jet milling process, an average particle size of 0.9 μm was produced.

Example 2

In this example, the geopolymer composite was prepared via sol-gel emulsification and with addition of carbon black with an average primary particle size of 95 nm.

8.5 kg of thermal silica (Hueber), 10.6 kg sodium aluminate (Chemexis) component, 4.8 kg of carbon black (Orion Carbons) and 12 kg deionized water were placed in a vessel. The composition was mixed at room temperature for 60 minutes at 700 rpm, until the paste was homogenous. Afterwards, 27 kg of deionized water was added to the composition. Meanwhile, a solution of 150 kg cyclohexane and 50 kg polyethylene glycol sorbitan monostearate (Polysorbate 60) was prepared, and after ca. 30 minutes of mixing at room temperature, the solution was subjected to sonification and heated up to 40° C. In the next step, prepared geopolymer gel was poured into the cyclohexane and polyethylene glycol sorbitan monostearate (Polysorbate 60) solution, at a rate of 10 dm$^3$/min under continuous mixing at 700 rpm, and at a temperature of 40° C. The resultant emulsion was maintained under mixing for another 15 minutes, at a temperature of 40° C., until a significant increase in viscosity occurred. In order to perform particle size analysis, 3 g sample was rinsed with 150 cm$^3$ of ethanol. The resultant product was mixed with 20 g of water and subjected to a particle size measurement using wet method. Dynamic light scattering experiments indicated that the emulsion had the identical particle size distribution (0.6 μm) as in Example 1 (FIG. 2). In the next step, the emulsion was centrifuged, decanted in water and filtrated. The precipitate was suspended in water, steam stripped in a stripping column from the rest of organic solvent, and then dispersed in water for further processing. A sodium content of 300 ppm was analysed in the final powder. Finally, after a jet milling process, an average particle size of 1 μm was produced.

Example 3

In this example, geopolymer was obtained via sol-gel decantation with addition of hydrochloric acid.

12.75 kg of silica (Huber), 17.25 kg sodium aluminate (Chemexis) component and 18 kg deionized water were placed in a vessel. The composition was mixed at room temperature for 60 minutes at 500 rpm, until the paste was homogenous. Meanwhile, the solution of 60 kg deionized water and 1% sodium dodecyl sulphate (SDS) was prepared in a separate vessel. In the next step, prepared geopolymer gel was poured into the water and SLS solution, at a rate of 10 dm$^3$/min, under continuous mixing at 500 rpm and at room temperature. The resultant mixture was maintained under mixing for another 60 minutes and afterwards 30 kg of 37% HCl solution were added, with an addition rate of 10 dm$^3$/min. The mixture was filtrated and rinsed with water. A small sample of precipitated product was taken for the particle size distribution measurement. Static light scattering experiments indicated that the emulsion had a particle size distribution of d50=4.4 μm (FIG. 3). The slurry was filtrated and dispersed in water to perform further modification. A sodium content of 100 ppm was analysed in the final powder. Finally, after a jet milling process, an average particle size of 2.5 μm was produced.

Example 4

In this example, geopolymer was prepared via decantation with addition of KPS surfactant, without addition of hydrochloric acid.

12.75 kg of thermal silica (Saint Gobain), 17.25 kg sodium aluminate (Chemexis) component and 18 kg deionized water were placed in a vessel. The composition was mixed at room temperature for 60 minutes at 700 rpm, until the paste was homogenous. Meanwhile, a solution of 300 kg deionized water and 2% potassium persulphate (KPS) was prepared in a separate vessel, subjected to sonification and heated up to 40° C. In the next step, prepared geopolymer gel was dropped into water and KPS solution, at a rate of 10 $dm^3$/min under continuous mixing using homogenizer at speed of 24,000 rpm and at a temperature of 40° C. The resultant emulsion was maintained under mixing for another 60 minutes at temperature of 40° C., and a small sample was taken for a particle size distribution measurement and the rest of the material left for sedimentation and afterwards poured with water. Static light scattering experiments indicated that the dispersion had a particle size distribution of 0.9 μm (FIG. 4). The slurry was filtrated and dispersed in water, to perform further modification. A sodium content of 200 ppm was analysed in the final powder. Finally, after a jet milling process, an average particle size of 1 μm was produced.

Example 5

In this example, geopolymer was prepared via decantation with addition of SDS surfactant, without addition of hydrochloric acid.

12.75 kg of thermal silica (Saint Gobain), 17.25 kg sodium aluminate (Chemexis) component and 18 kg deionized water were placed in a vessel. The composition was mixed at room temperature for 60 minutes at 700 rpm, until the paste was homogenous. Meanwhile, a solution of 300 kg deionized water and 0.7% sodium dodecyl sulphate (SDS) was prepared in a separate vessel, subjected to sonification and heated up to 40° C. In the next step, prepared geopolymer gel was poured into water and SDS solution, at a rate of 10 $dm^3$/min, under continuous mixing using a homogenizer at a speed of 9,400 rpm and at a temperature of 40° C. The resultant emulsion was maintained under mixing for another 30 minutes at a temperature of 40° C., and a small sample was taken for the particle size distribution measurement, and the rest of the material left for sedimentation and afterwards rinsed with water. A static light scattering experiment indicated that the emulsion had a particle size distribution of d50=1.1 μm (FIG. 5). A sodium content of 300 ppm was analysed in the final powder. Finally, after a jet milling process, an average particle size of 1 μm was produced.

Example 6

In this example, geopolymer was prepared via decantation only, with addition of water excess.

12.75 kg of thermal silica (Saint Gobain), 17.25 kg sodium aluminate (Chemexis) component and 18 kg deionized water were placed in a vessel. The composition was mixed at room temperature for 60 minutes at 700 rpm, until the paste was homogenous. Meanwhile, 300 kg of deionized water was prepared in a separate vessel, subjected to sonification and heated up to 40° C. In the next step, prepared geopolymer gel was poured into water, at rate of 10 $dm^3$/min, under continuous mixing using a homogenizer at a speed of 24,000 rpm and at a temperature of 40° C. The resultant composition was maintained under mixing for 2.0 h at a temperature of 40° C. A small sample was taken for the particle size distribution measurement, and the rest of the material left for sedimentation. A static light scattering experiment indicated that the mixture had a particle size distribution d50=1.1 μm (FIG. 6). A sodium content of 200 ppm was analysed in the final powder. Finally, after a jet milling process, an average particle size of 1 μm was produced.

Example 7

In this example, geopolymer composite was prepared via decantation with addition of water excess and with addition of nano graphene oxide with an average particle size of 500 nm.

12.75 kg of thermal silica (Saint Gobain), 17.25 kg sodium aluminate (Chemexis) component and 18 kg deionized water were placed in a vessel. The composition was mixed at room temperature for 60 minutes at 700 rpm, until the paste was homogenous. In the next step, 7.5 kg nano graphene oxide (Garmor) was added under continuous mixing, and the mixing was continued for another 30 minutes. Meanwhile, 300 kg of deionized water was prepared in a separate vessel, subjected to sonification and heated up to 40° C. In the next step, prepared geopolymer gel with nano graphene oxide was poured into water, at rate of 10 $dm^3$/min, under continuous mixing using a homogenizer at a speed of 24,000 rpm and at a temperature of 40° C. The resultant composition was maintained under mixing for 2 h, at a temperature of 40° C. A small sample was taken for the particle size distribution measurement and the rest of the material left for sedimentation. A static light scattering experiment indicated that the emulsion had a particle size distribution of d50=1.0 μm (FIG. 7). A sodium content of 200 ppm was analysed in the final powder. Finally, after a jet milling process, an average particle size of 1 μm was produced.

Example 8

In this example, geopolymer composite was obtained via decantation, with addition of water excess and with addition of titanium oxide having an average particle size of 100 nm.

12.75 kg of thermal silica (Saint Gobain), 17.25 kg sodium aluminate (Chemexis) component and 18 kg deionized water were placed in a vessel. The composition was mixed at room temperature for 60 minutes at 700 rpm, until the paste was homogenous. In the next step, 7.5 kg nano $TiO_2$ (Showa America) was added under continuous mixing and the mixing was continued for another 30 minutes. Meanwhile, 300 kg of deionized water was prepared in a separate vessel, subjected to sonification and heated up to 40° C. In the next step, prepared geopolymer gel with nano $TiO_2$ was poured into water, at rate of 10 $dm^3$/min, under continuous mixing using a homogenizer at a speed of 24,000 rpm and at a temperature of 40° C. The resultant composition was maintained under mixing for 2 h, at a temperature of 40° C. A small sample was taken for the particle size distribution measurement, and the rest of the material left for sedimentation. Particle size distribution d50=1.0 μm (FIG. 8). A sodium content of 100 ppm was analysed in the final powder. Finally, after a jet milling process, an average particle size of 0.8 µm was produced.

Example 9

In this example, geopolymer composite was prepared via decantation, with addition of water excess and with addition of petroleum coke having a D50 of 3.0 µm.

12.75 kg of thermal silica (Saint Gobain), 17.25 kg sodium aluminate (Chemexis) component and 18 kg deionized water were placed in a vessel. The composition was mixed at room temperature for 60 minutes at 700 rpm, until the paste was homogenous. In the next step, 13.5 kg petroleum coke (Oxbow) was added under continuous mixing and the mixing was continued for another 30 minutes. Meanwhile, 300 kg of deionized water was prepared in a separate vessel, subjected to sonification and heated up to 40° C. In the next step, prepared geopolymer composite gel was poured into water, at a rate of 10 dm$^3$/min, under continuous mixing using a homogenizer at a speed of 24,000 rpm and at a temperature of 40° C. The resultant composition was maintained under mixing for 2 h, at a temperature of 40° C. A small sample was taken for the particle size distribution measurement, and the rest of the material left for sedimentation. Particle size distribution d50=3.0 µm (FIG. 9). A sodium content of 200 ppm was analysed in the final powder. Finally, after a jet milling process, an average particle size of 3.0 µm was produced.

In all the above experiments for geopolymer or geopolymer composite, the further processing steps were performed:
1. Dealkalization,
2. First step filtration,
3. Washing with process water,
4. Washing with acid solution,
5. Granulated and added to make repulpation in 0.1% acid solution,
6. Second step filtration,
7. Washing with demineralized water,
8. Modification with 3% water solution of phosphoric acid,
9. Again dispersed in water,
10. Spray dried,
11. Jet milled to get back the finest particle size.

Optionally, the water dispersion of geopolymer or geopolymer composite particles (both obtained via emulsion or decantation method) containing 2 parts of water and 1 part of powder was then placed in a 0.4 m$^3$ in a heated dissolver (reactor), equipped with a high speed agitator and a ribbon stirrer turning closely to the dissolver walls. An amount of (44% per weight of powder) concentrated aqueous hydrochloric acid (30%) was then added over 5 min to the reactor and dealkalization was performed. The starting pH, as measured before acid addition, was 13, after 60 min of mixing and dealkalization, the final pH was 7.5. The water (filtrate) with conductivity of about 80,000 µS/cm was filtrated from the powder of geopolymer composite and a precipitate was obtained containing of approx. 50 wt. % of water. Then, a portion of process water was used to wash remaining sodium chloride and other chlorides from the precipitate. Washing was continued for 20 min, to obtain a filtrate conductivity below 400 US/cm.

Alternatively, demineralized water could be used, reducing the filtrate conductivity below 300 µS/cm. To help destroy the thixotropic effect, the washing with 0.1% hydrochloric acid solution could be performed after the wash with process or demineralized water. After that, the membrane squeeze of about 16 bar was applied, to increase the solids content to 55 wt. %. The precipitate was removed from the press, granulated and loaded to a repulpation dissolver with the same mixing system as for the dealkalization reactor. Further salts elution in diluted solution of hydrochloric acid (0.1%) and deionized water was performed. Following repulpation, the slurry was filtrated and washed for about 20 min, to obtain a filtrate with conductivity below 100 µS/cm. As a next step, the precipitate was washed with 3 wt. % solution of phosphoric acid (preferably 75% concentrated) in demineralized water. It was pumped through the filter press, to modify the surface of geopolymer or geopolymer composite. The precipitate with a water content of about 45 wt. % was then again dispersed in water, in a repulpation dissolver. Finally, it was spray dried, and a free flowing powder with an average particle size of 10 µm was created. The powder was pneumatically transferred to the jet milling process, to obtain particles with an average particle size below or at least 5 µm or less according to the origin of obtained geopolymer or geopolymer composite. For all powders, the sodium content was analysed.

Sodium Analysis Description

A crucible with 0.05 g dried sample is placed in the oven for 5 h at 500° C. for burning. The ash after burning is cooled down, in the next step ca. 10 ml deionized water with 1 ml HCl (35-38%) is added to the crucible with sample, and the content is heated using a laboratory hotplate at 140° C. for 30 min. The sample is cooled down and transferred through the filter (cleaned beforehand for a minimum of 3 times using deionized water) into the 100 ml flask, in the next step 8 ml 1 M nitric acid with 4 ml spectral buffer of cesium chloride (2.5% Cs) is added. Simultaneously with the sample for analysis one control (blank) sample is prepared using the same procedure and the same reagents.

The sample solution as prepared applying the procedure described above is measured by Atomic Absorption Spectrometer, using a device AA iCE 3500 GFS35Z, and following parameters: working mode: absorption, wave length: 589.0 nm, gap: 0.2 nm, The presented analytical procedure is based on the standard defining Na analysis PN-ISO 9964-1:1994+Ap1:2009, sample preparation for measurement is based on internal procedure standard 61/A issue 3 dated 30 Apr. 2009.

Expandable Vinyl Aromatic Polymer Preparation

A mixture of vinyl aromatic polymer in the form of granules, containing 0.5 wt. % of Emerald 3000, 0.1 wt. % of bicumyl and 0.15 wt. % of nucleating agent (Polywax 2000) was dosed to the main hopper of the main 32D/40 mm twin-screw co-rotating extruder. The melt temperature in the main extruder was 180° C.

The geopolymer composite powder as prepared in Example 2 was dosed at a concentration of 16 wt. % to the side arm (54D/25 mm) twin-screw co-rotating extruder via two side feeders and the vinyl aromatic polymer (in the form of granules) was dosed to the main hopper of this extruder. The melt containing 30 wt. % of concentrated geopolymer additive was transported to the main extruder. The melt temperature inside the extruder was 190° C.

The blowing agent (n-pentane/isopentane mixture 80/20%) was injected to the main 32D/40 mm extruder, downstream from the injection of the melt from the side twin-screw extruder. The concentration of blowing agent was 5.5 wt. %, calculated on total mass of product.

The melt of vinyl aromatic polymer containing Emerald 3000 flame retardant, bicumyl, nucleating agent, geopolymer composite and blowing agent was transported to the 30D/90 mm cooling extruder and pumped through a 60 mm length static mixer, melt pump, screen changer, diverter valve and extruded through the die head with 0.75 mm diameter holes, and underwater pelletized by the rotating knifes. Downstream, the rounded product, a granulate with a particle size distribution of 99.9% of the fraction 0.8-1.6 mm was centrifuged to remove the water, and was finally coated by the suitable mixture of magnesium stearate with glycerine monostearate and tristearate. The melt temperature in the cooling extruder was 170° C.

The coated beads were expanded to measure the final general properties of expanded foam composite:
1. Thermal conductivity according to standard ISO 8301.
2. Mechanical properties (compressive and bending strength) according to standard EN 13163.
3. Flammability according to tests methods: EN ISO 11925-2 and DIN 4102 B2.
4. Dimensional stability under specified temperature and humidity conditions of expanded foam were determined according to standard PN-EN 1604+AC, which is normally used for XPS materials.

The expandable granulate with a particle size distribution 0.8 to 1.6 mm was in the pre-expander vessel treated for 50 sec. with steam having a pressure of 0.2 kPa, and was then dried in a connected fluid bed drier. The obtained beads' density was 15 kg/m³. Then, the expanded beads were conditioned in a silo for 24 h and introduced to a block mould with dimensions of 1000×1000×500 mm. Steam having a pressure of 0.7 kPa was used to weld the beads, and to obtain moulded blocks having a density of 15.5 kg/m³. The mould cooling time in this case was 70 sec. The ready block was cut into plates and then specimens taken after 6 days of conditioning at room temperature.

Example 1/2

In this example, geopolymer composite, as obtained with addition of typical carbon black (available from Orion Carbons), was used in an amount of 16 wt %. The example shows that good foam properties including low "lambda" can be obtained especially when particles with an average size (D50) of 1.0 μm were applied.

Example 2/9

In this example, geopolymer composite as obtained with addition of graphene oxide with an average particle size (D50) of 1 μm was used. Also, good foam properties were obtained, including low "lambda".

Example 3/9

In this example, geopolymer composite as obtained with addition of petroleum coke with an average particle size of 3 μm was used. The foam again shows good properties.

TABLE 11.1

Examples summary for prepared EPS foams.

| Examples | 1/2 | 2/9 | 3/9 |
| --- | --- | --- | --- |
| Synthos PS 585X | YES | YES | YES |
| Geopolymer composite (wt. %)/type/ | 16/2/ | 16/7/ | 12.2/9/ |
| Emerald 3000 (wt. %) | 0.5 | 0.5 | 0.5 |
| Bicumyl (wt. %) | 0.1 | 0.1 | 0.1 |
| Polywax 2000 (wt. %) | 0.15 | 0.15 | 0.15 |
| Pentane/Isopentane 80/20 (wt. %) | 5.5 | 5.5 | 5.5 |

TABLE 12

Expanded foam composite parameters at ca. 15.0 kg/m³.

| Examples | 1 | 2 | 3 |
| --- | --- | --- | --- |
| Dimensional stability at temp. 70° C. and humidity 50 ± 5% (% of shape change) | 0.10 | 0.10 | 0.10 |
| Thermal conductivity (mW/m · K) | 30.2 | 30.0 | 30.6 |
| Flammability (EN ISO 11925-2) | + | + | + |
| Flammability (DIN 4102 B2) | + | + | + |
| Compressive strength at 10% def. (kPa) | 70 | 75 | 65 |
| Bending strength (kPa) | 140 | 147 | 134 |

Passed (+);
Not passed (−)

The invention claimed is:

1. Process for the production of a geopolymer or geopolymer composite, comprising
   a) mixing of precursor for aluminate and silicate in alkaline solution, comprising sodium silicate, sodium aluminate, sodium disilicate, sodium phosphoaluminate, or a mixture thereof, to form a sol-gel,
   b) optionally adding of one or more additives to the sol-gel, to form a filled sol-gel,
   c) adding water to the sol-gel or filled sol-gel, to form a diluted sol-gel or diluted filled sol-gel,
   d) mixing of the diluted sol-gel or diluted filled sol-gel, to form geopolymer or geopolymer composite, without curing drying and milling of the geopolymer or of the geopolymer composite,
   e) obtaining a suspension of the geopolymer or of the geopolymer composite,
   wherein step e) comprises
   e1) decanting, wherein step e1) comprises
   e1a) applying high shear mixing and ultrasound with high energy to induce cavitation,
   e1b) optionally adding acid,
   e1c) decanting, and
   e1d) optionally membrane filtering, and precipitate cake washing
   or
   e2) adding an organic phase, emulsifying and stripping of the organic phase, wherein
   step e2) comprises
   e2a) adding an organic phase,
   e2b) emulsifying the sol-gel,
   e2c) applying high shear mixing and ultrasound with high energy, to induce cavitation,
   e2d) steam stripping to remove the organic phase, and
   e2e) dispersing the geopolymer or the geopolymer composite in water;
   f) reducing the content of sodium cation within the structure of the geopolymer or geopolymer composite, and
   g) obtaining the geopolymer or geopolymer composite,
   wherein the geopolymer or geopolymer composite has a sodium content of less than 200 ppm, measured according to PN-ISO 9964-1:1994+Apl:2009 and calculated on dry mass.

2. The process of claim 1, wherein the mixing in step a) comprises mixing an aluminosilicate, a phospho-aluminate, an alkaline silicate and/or an alkaline aluminate.

3. The process of claim 1, wherein the mixing in step a) involves one or more materials selected from the group consisting of dehydroxylated kaolinite, metakaolin, metakaolinite, fly ash, furnace slag, red mud, thermal silica, fumed silica, halloysite, mine tailings, pozzolan, kaolin, and building residues.

4. The process of claim 1, wherein the additive is selected from the group consisting of
   a. carbon-based athermanous additives,
   b. metal athermanous additives,
   C. metal oxide athermanous additives, and
   d. metal sulfide athermanous additives.

5. The process of claim 1 wherein silane is added in step a).

6. The process of claim 5, wherein the silane is 3-methacryloxypropyltrimethoxysilane, the process further comprising adding a butadiene latex in one or more of steps a), b), and c).

7. The process of claim 1 wherein silane is added in any of step e), step f), and step g).

8. The process of claim 1, wherein step f) comprises adding an acid solution.

9. The process of claim 1, the process further comprising modifying with one or more water-soluble compounds.

10. The process of claim 9, wherein the water-soluble compound is selected from phosphorus compounds, nitrogen compounds, copper compounds, silver compounds, zinc compounds, tin compounds, and magnesium compounds.

11. The process of claim 1, wherein step f) comprises repulpating.

12. The process of claim 1, wherein step g) comprises repulpating.

13. The process of claim 1, including step e1), wherein step e1a) comprises adding one or more surfactants.

14. The process of claim 13, wherein the one or more surfactants comprise an ionic surfactant.

15. The process of claim 1, including step e2), wherein step e2b) comprises adding one or more surfactants.

16. The process of claim 1, wherein step e2e) comprises dispersing the geopolymer or the geopolymer composite in deionized water.

17. The process of claim 1, wherein the mixing in step a) involves metakaolin or metakaolinite, furnace slag, fly ash, or a mixture thereof.

18. The process of claim 1, wherein the additive is selected from
   a. carbon black, coke, graphitized carbon black, graphite oxides, graphite, anthracite, graphene oxide, and graphene, and
   c. titanium oxide, chamotte, fly ash, fumed silica, hydromagnesite, huntite, and mineral having perovskite structure.

19. The process of claim 4, wherein the athermanous additive is selected from carbon-based athermanous additives selected from heat absorbers and heat reflectors.

20. The process of claim 1, wherein silane is added in step a), wherein the silane is selected from aminopropyltriethoxysilane, aminopropyltrimethoxysilane, phenyltriethoxysilane, 3-methacryloxypropyltrimethoxysilane, vinyltrimethoxysilane, and mixtures thereof.

21. The process of claim 1, wherein silane is added in any of step e), step f), and step g),
   wherein the silane is selected from aminopropyltriethoxysilane, aminopropyltrimethoxysilane, phenyltriethoxysilane, 3-methacryloxypropyltrimethoxysilane, and mixtures thereof.

22. The process of claim 1, wherein step f) comprises adding an acid solution and washing with water.

23. The process of claim 1, the process further comprising modifying with one or more water-soluble compounds,
   wherein the modifying is in one or more of step f) and step g).

24. The process of claim 9, wherein the water-soluble compound is selected from phosphorus compounds, nitrogen compounds, copper compounds, silver compounds, zinc compounds, tin compounds, and magnesium compounds.

25. The process of claim 9, wherein the modifying is with a phosphorus compound selected from phosphoric acid and ammonium polyphosphate.

26. The process of claim 1, wherein step f) comprises repulpating, wherein the repulpating is with demineralized water or an acid solution.

27. The process of claim 1, wherein step f) comprises repulpating, wherein the repulpating is with an acid solution.

28. The process of claim 1, wherein step g) comprises repulpating, wherein the repulpating is with demineralized water.

29. The process of claim 1, wherein step e) comprises
   e2) adding an organic phase, emulsifying, and stripping of the organic phase, wherein
   step e2) comprises
   e2a) adding an organic phase,
   e2b) emulsifying the sol-gel,
   e2c) applying high shear mixing and ultrasound with high energy, to induce cavitation,
   e2d) steam stripping to remove the organic phase, and
   e2e) dispersing the geopolymer or the geopolymer composite in water.

* * * * *